(12) United States Patent
Kim et al.

(10) Patent No.: US 11,902,925 B2
(45) Date of Patent: Feb. 13, 2024

(54) AUTONOMOUS VEHICLE AND CONTROL METHOD THEREOF

(71) Applicant: LG ELECTRONICS INC., Seoul (KR)

(72) Inventors: Jeongin Kim, Seoul (KR); Dongsun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/906,466

(22) PCT Filed: May 22, 2020

(86) PCT No.: PCT/KR2020/006676
§ 371 (c)(1),
(2) Date: Sep. 15, 2022

(87) PCT Pub. No.: WO2021/235575
PCT Pub. Date: Nov. 25, 2021

(65) Prior Publication Data
US 2023/0137019 A1 May 4, 2023

(51) Int. Cl.
*H04W 56/00* (2009.01)

(52) U.S. Cl.
CPC ... *H04W 56/0015* (2013.01); *H04W 56/0035* (2013.01)

(58) Field of Classification Search
CPC ......... H04W 56/0015; H04W 56/0035; H04W 56/00; H04W 56/001; H04W 88/06; H04W 88/02; H04W 88/085; H04W 4/18; H04W 24/08; B60W 50/00; B60W 60/00; B60W 50/0098; B60W 60/001; B60W 2050/0005; B60W 2050/0064; H04B 7/04;
(Continued)

(56) References Cited

U.S. PATENT DOCUMENTS 5,732,330 A * 3/1998 Anderson .............. H04B 1/406
455/76
6,728,301 B1 * 4/2004 Chrisikos ............. H04B 1/7087
375/147
(Continued)

FOREIGN PATENT DOCUMENTS

KR 20180039567 4/2018
WO 2020071878 4/2020

OTHER PUBLICATIONS

PCT International Application No. PCT/KR2020/006676, International Search Report dated Feb. 19, 2021, 3 pages.
(Continued)

*Primary Examiner* — Lana N Le
(74) *Attorney, Agent, or Firm* — LEE, HONG, DEGERMAN, KANG & WAIMEY

(57) ABSTRACT

A control method of a distributed antenna system (DAS) including a baseband modem, according to one embodiment, may comprise the steps of: calculating frequency offsets for each RF path in the baseband modem; controlling an oscillator clock of a central unit (CU) on the basis of an average of the frequency offsets; determining an operation mode of the baseband modem; and controlling oscillator clocks of each distributed unit (DU) on the basis of the frequency offsets for each RF path when the operation mode of the baseband modem is a tracking mode.

17 Claims, 23 Drawing Sheets

(58) Field of Classification Search
CPC .......................... H04B 1/406; H04B 10/6164; H04B 10/6165; H04B 2001/70706; H04B 1/40; H04B 1/7085; H04B 1/7073; H04B 1/7087; H04B 1/7156; H04B 17/21; H04B 17/24; H04B 1/12; H04L 7/00; H04L 7/027; H04L 2027/003; G01S 1/24; B64U 2201/10
See application file for complete search history.

(56) References Cited

U.S. PATENT DOCUMENTS

| | | | |
|---|---|---|---|
| 6,771,590 B1* | 8/2004 | Marchok | H04W 56/00 370/207 |
| 2009/0129787 A1* | 5/2009 | Li | H04B 10/6165 398/208 |
| 2011/0002364 A1* | 1/2011 | Michaels | H04B 1/70706 375/141 |
| 2014/0044096 A1* | 2/2014 | Heinrich | H04W 56/00 370/328 |
| 2019/0159277 A1 | 5/2019 | Zhu et al. | |
| 2020/0092901 A1 | 3/2020 | Barabell et al. | |

OTHER PUBLICATIONS

Zakrzewski, "D-RoF and A-RoF Interfaces in an All-Optical Fronthaul of 5G Mobile Systems," MDPI, Feb. 2020, 29 pages.

\* cited by examiner

AUTONOMOUS VEHICLE AND CONTROL METHOD THEREOF

CROSS-REFERENCE TO RELATED APPLICATION(S)

This application is the National Stage filing under 35 U.S.C. 371 of International Application No. PCT/KR2020/006676, filed on May 22, 2020, the contents of which are all incorporated by reference herein in its entirety.

TECHNICAL FIELD

The present disclosure relates to a method and apparatus for wireless communication of a vehicle in an autonomous driving system, and more particularly, to an autonomous vehicle for performing wireless communication through multiple antennas and a control method thereof.

BACKGROUND ART

Vehicles may be classified as internal combustion engine vehicles, external combustion engine vehicles, gas turbine vehicles, electric vehicles, and the like, according to types of prime movers used therein.

An autonomous vehicle refers to a vehicle that can be driven by itself without operation by a driver or a passenger and an autonomous driving system refers to a system that monitors and controls such an autonomous vehicle so that the autonomous vehicle can be driven by itself.

Meanwhile, a main controller within an autonomous vehicle having a distributed antenna structure and a plurality of distributed antenna modules need to share operation clocks with each other to send and receive data properly. Also, a UE needs to be synchronous with an operation clock of a base station.

In the distributed antenna structure, however, each antenna module and the main controller are split into a distributed unit and a central unit. Thus, there is a need for a method for synchronizing clocks of each unit in such a connection structure.

DISCLOSURE OF INVENTION

Technical Problem

An aspect of the present disclosure is to solve the necessities and/or problems described above.

Another aspect of the present disclosure is to implement a structure for synchronizing clocks between a main controller and each antenna unit in a distributed antenna structure provided in an autonomous vehicle.

Another aspect of the present disclosure is to implement an autonomous vehicle for synchronizing clocks between a base station and an autonomous vehicle in a distributed antenna structure provided in the autonomous vehicle and a control method thereof.

Another aspect of the present disclosure is to implement an autonomous vehicle for compensating for clock error between each distributed unit in a distributed antenna structure provided in the autonomous vehicle and a control method thereof.

Solution to Problem

A distributed antenna system (DAS) including a baseband modem according to one embodiment of the present disclosure includes the steps of: calculating frequency offsets for each RF path in the baseband modem; controlling an oscillator clock of a central unit (CU) on the basis of an average of the frequency offsets; determining an operation mode of the baseband modem; and controlling oscillator clocks of each distributed unit (DU) on the basis of the frequency offsets for each RF path when the operation mode of the baseband modem is a tracking mode.

Furthermore, the control method may further include the step of transmitting the oscillator clock of the central unit (CU) to each distributed unit (DU) when the operation mode of the baseband modem is an acquisition mode.

Furthermore, in the tracking mode, oscillator clock errors of each distributed unit (DU) are individually controlled to have different values, and in the acquisition mode, the oscillator clock errors of each distributed unit (DU) are commonly controlled to have the same value.

Furthermore, the control method may further include, after the step of transmitting the oscillator clock of the central unit (CU) to each distributed unit (DU), the steps of: synchronizing an oscillator clock of the DU by each distributed unit (DU), based on a difference between the oscillator clock of the DU and the oscillator clock of the CU; providing a synchronized oscillator clock as a reference clock to an RF device of the DU; and providing a radio signal from the base station to the baseband modem via a DU-CU interface through the RF device.

Furthermore, in the step of controlling an oscillator clock of each distributed unit (DU) on the basis of the frequency offsets for each RF path, oscillator clock errors of each distributed unit (DU) are individually controlled to have different values. The control method may further include, after the step of individually controlling an oscillator clock of each distributed unit (DU), the steps of: providing an individually controlled oscillator clock as a reference clock to an RF device of the DU; and providing a radio signal from the base station to the baseband modem via a DU-CU interface through the RF device.

Furthermore, the control method may further include the step of calculating frequency offsets for each RF path in the baseband modem with respect to the radio signal from the base station, after the step of providing a radio signal from the base station to the baseband modem.

Furthermore, the step of calculating frequency offsets may include calculating frequency offsets with the clock of the base station based on the in-phase component and quadrature phase component of a signal received for each RF path.

Furthermore, in the step of determining an operation mode of the baseband modem, upon determining that the baseband modem has performed cell search, it is determined that the operation mode of the baseband modem is the tracking mode, and upon determining that the operation mode of the baseband modem is performed before the cell search, it is determined that the operation mode of the baseband modem is the acquisition mode.

Furthermore, in the step of determining an operation mode of the baseband modem, it is determined whether PBCH (physical broadcasting channel) has been successfully received, and, if the PBCH has been successfully received, it is determined that the operation mode of the baseband modem is the tracking mode, and if the PBCH has not been successfully received, it is determined that the operation mode of the baseband modem is the acquisition mode.

According to another embodiment, a distributed antenna system including a baseband modem and a plurality of distributed antennas includes: a plurality of distributed units DU; and a central unit (CU) operatively coupled to the plurality of distributed units and to control the plurality of distributed units, wherein the central unit calculates frequency offsets for each RF path in the baseband modem, and controls an oscillator clock of the central unit (CU) on the basis of an average of the frequency offsets, Furthermore, oscillator clocks of each distributed unit (DU) are controlled on the basis of the frequency offsets for each RF path when the operation mode of the baseband modem is a tracking mode, and the oscillator clock of the central unit (CU) is transmitted to each distributed unit (DU) when the operation mode of the baseband modem is an acquisition mode.

According to another embodiment, an autonomous vehicle includes: a processor for controlling functions of the vehicle; a memory coupled to the processor, for storing data for control of the vehicle; and a communication device coupled to the processor, for sending and receiving data for control of the vehicle, the communication device including a central unit (CU) and a plurality of distributed units operatively coupled to the central unit (CU). The processor calculates frequency offsets for each RF path in the communication device, and controls an oscillator clock of the central unit (CU) on the basis of an average of the frequency offsets.

Furthermore, the oscillator clock of the central unit (CU) is controlled on the basis of an average of the frequency offsets, and oscillator clocks of each distributed unit (DU) are controlled on the basis of the frequency offsets for each RF path when the operation mode of the vehicle is a tracking mode, and the oscillator clock of the central unit (CU) is transmitted to each distributed unit (DU) when the operation mode of the vehicle is an acquisition mode.

Advantageous Effects of Invention

An autonomous vehicle and a control method thereof according to one embodiment of the present disclosure has the following effects.

The present disclosure allows for low-cost design using data clock recovery by suggesting a method of synchronizing clocks between a central unit (controller) and a distributed unit (antenna) in an autonomous vehicle including a distributed antenna structure.

Furthermore, the present disclosure may provide higher speed data transmission/reception performance compared to an existing analog interface, via a HSSI (high speed serial interface) between a central unit and a distributed unit.

Furthermore, the present disclosure may enhance the wireless communication performance of an autonomous driving system by improving the expandability of a distributed antenna structure.

Furthermore, the present disclosure may improve the reception performance of a modem by minimizing clock offsets for each RF path and time tracking error in a distributed antenna system.

Furthermore, the present disclosure may improve performance degradation that occurs in a high MCS situation by minimizing clock offsets for each RF path and time tracking error in a distributed antenna system.

The effects obtained by the present disclosure are not limited to the aforementioned, and other effects not mentioned can be clearly understood on the following description by those skilled in the art to which the present disclosure pertains.

BRIEF DESCRIPTION OF DRAWINGS

Accompanying drawings included as a part of the detailed description for helping understand the present disclosure provide embodiments of the present disclosure and are provided to describe technical features of the present disclosure with the detailed description.

MODE FOR THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A. Example of Block Diagram of UE and 5G Network

Figure 1:
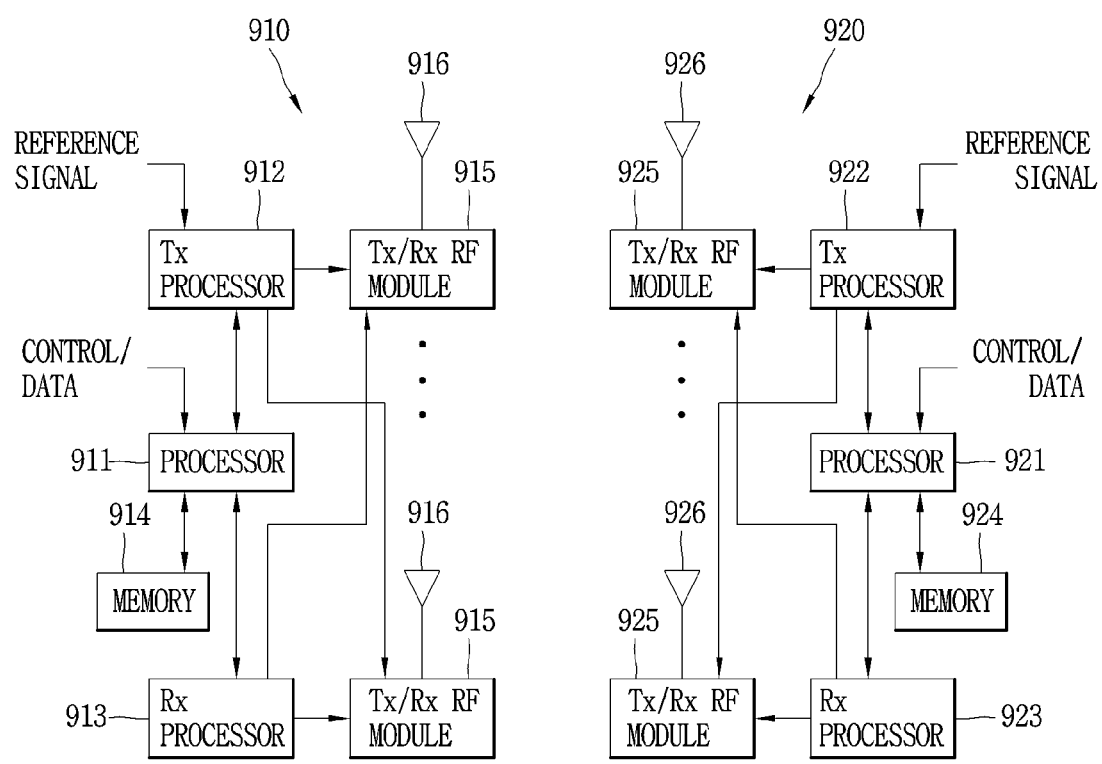
FIG. 1 illustrates a block diagram of a wireless communication system to which methods proposed in the present disclosure are applicable.

FIG. 1 illustrates a block diagram of a wireless communication system to which methods proposed in the present disclosure are applicable.

Referring to FIG. 1, a device (autonomous device) including an autonomous module is defined (910 of FIG. 1) as a first communication device, and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, and antennas 916 and 926. The Tx/Rx module is also referred to as a transceiver. Each Tx/Rx module 915 transmits a signal through each antenna 926. The processor implements the aforementioned functions, processes, and/or methods. The processor 921 may be related to the memory 924 which stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 which stores program code and data. The memory may be referred to as a computer-readable medium.

B. Signal Transmission/Reception Method in Wireless Communication System

Figure 2:
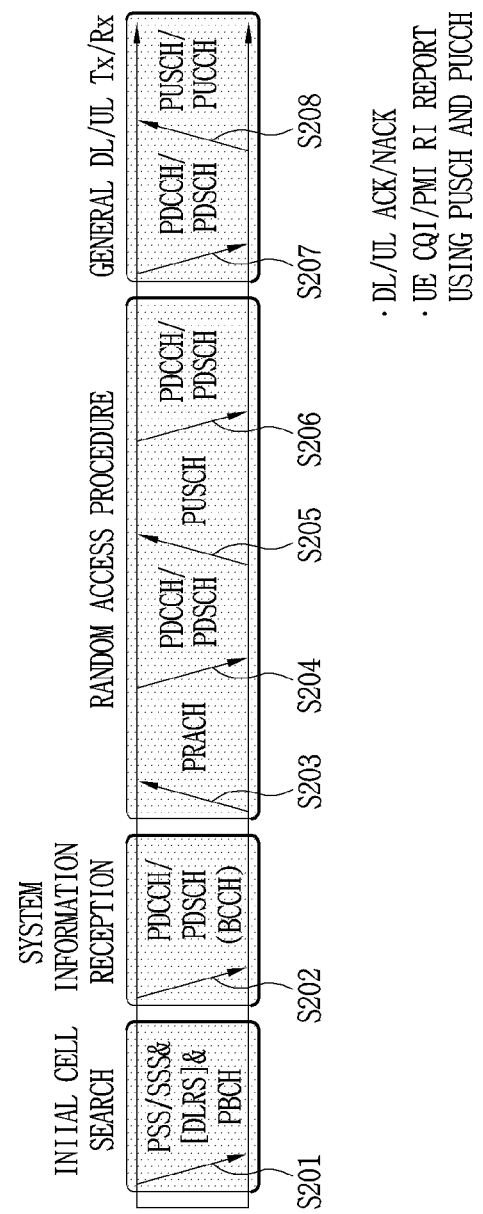
FIG. 2 shows an example of a method of signal transmission/reception in a wireless communication system.

FIG. 2 illustrates physical channels used in a 3GPP system and general signal transmission.

In a wireless communication system, a UE receives information from a BS through downlink (DL) and transmits information to the BS through uplink (UL). Information transmitted/received between the UE and BS includes data and various types of control information, and various physical channels are present according to type/purpose of information transmitted/received between the UE and the BS.

When a UE is powered on or enters a new cell, the UE performs an initial cell search operation such as synchronization with a BS (S201). To this end, the UE may receive a primary synchronization signal (PSS) and a secondary synchronization signal (SSS) from the eNB to synchronize with the BS and acquire information such as a cell ID. Thereafter, the UE may receive a physical broadcast channel (PBCH) from the BS to obtain intra-cell broadcast information. Meanwhile, the UE may receive a downlink reference signal (DL RS) in the initial cell search step to check a downlink channel state.

After the initial cell search, the UE may receive a physical downlink control channel (PDCCH) and a physical downlink shared channel (PDSCH) according to information included in the PDCCH to acquire more detailed system information (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH. In the case of a contention-based RACH, a contention resolution procedure may be additionally performed (206).

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE may receive downlink control information (DCI) through the PDCCH. Here, the DCI includes control information such as resource allocation information for the UE, and different formats may be applied according to the purpose of use.

On the other hand, the control information transmitted by the UE to the BS through the uplink or received from the BS by the UE may include a downlink/uplink ACK/NACK signal, a channel quality indicator (CQI), a precoding matrix index (PMI), a rank indicator (RI), and so on. The UE may transmit control information such as the above-described CQI/PMI/RI through PUSCH and/or PUCCH.

Referring to FIG. 2, an initial access (IA) procedure in a 5G communication system will be additionally described.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is composed of four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups, and there are 3 cell IDs per cell ID group. That is, a total of 1.008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

Referring to FIG. 2. a random access (RA) procedure in a 5G communication system will be additionally described.

A random access process is used for various purposes. For example, a random access process may be used for network initial access, handover, UE-triggered UL data transmission. A UE may obtain UL synchronization and an UL transmission resource through a random access process. The random access process is divided into a contention-based random access process and a contention-free random access process. A detailed procedure for the contention-based random access process is described below.

A UE may transmit a random access preamble through a PRACH as Msg1 of a random access process in the UL. Random access preamble sequences having two different lengths are supported. A long sequence length 839 is applied to subcarrier spacings of 1.25 and 5 kHz, and a short sequence length 139 is applied to subcarrier spacings of 15, 30, 60 and 120 kHz.

When a BS receives the random access preamble from the UE, the BS transmits a random access response (RAR) message (Msg2) to the UE. A PDCCH that schedules a PDSCH carrying an RAR is CRC masked with a random access (RA) radio network temporary identifier (RNTI) (RA-RNTI), and is transmitted. The UE that has detected the PDCCH masked with the RA-RNTI may receive the RAR from the PDSCH scheduled by DCI carried by the PDCCH. The UE identifies whether random access response information for the preamble transmitted by the UE, that is, Msg1, is present within the RAR. Whether random access information for Msg1 transmitted by the UE is present may be determined by determining whether a random access preamble ID for the preamble transmitted by the UE is present. If a response for Msg1 is not present, the UE may retransmit an RACH preamble within a given number, while performing power ramping. The UE calculates PRACH transmission power for the retransmission of the preamble based on the most recent pathloss and a power ramping counter.

The UE may transmit UL transmission as Msg3 of the random access process on an uplink shared channel based on random access response information. Msg3 may include an RRC connection request and a UE identity. As a response to the Msg3, a network may transmit Msg4, which may be treated as a contention resolution message on the DL. The UE may enter an RRC connected state by receiving the Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured with an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
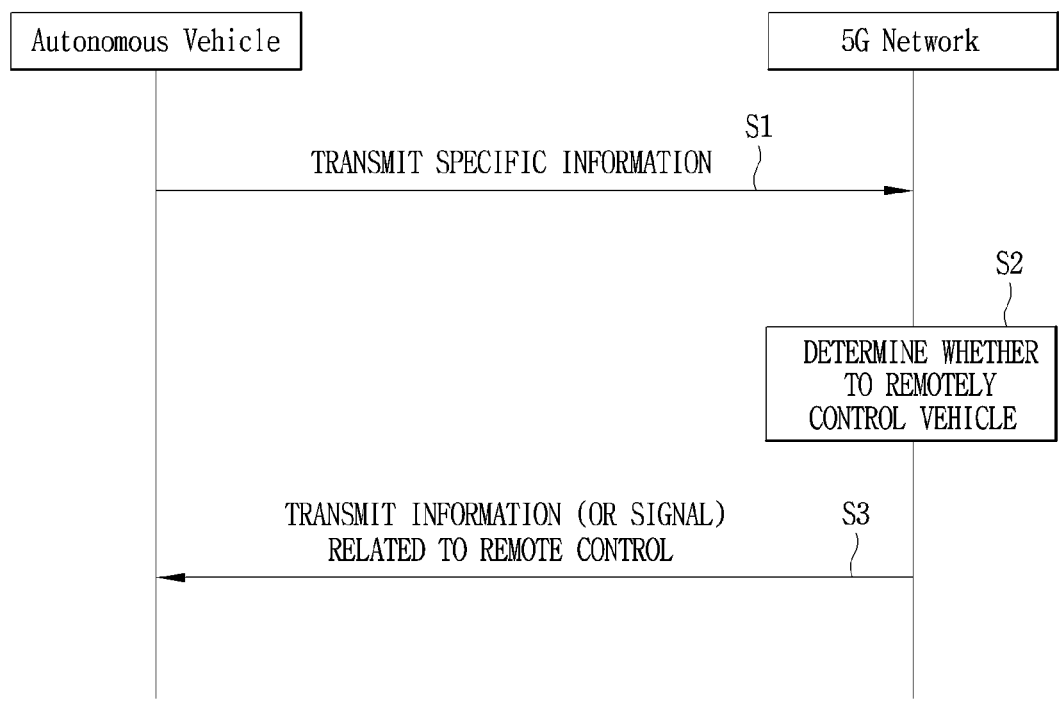
FIG. 3 shows an example of a basic operation of an autonomous vehicle and a 5G network in a 5G communication system.

FIG. 3 shows an example of a basic operation of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

H. Autonomous Driving Operation Between Vehicles Using 5G Communication

Figure 4:
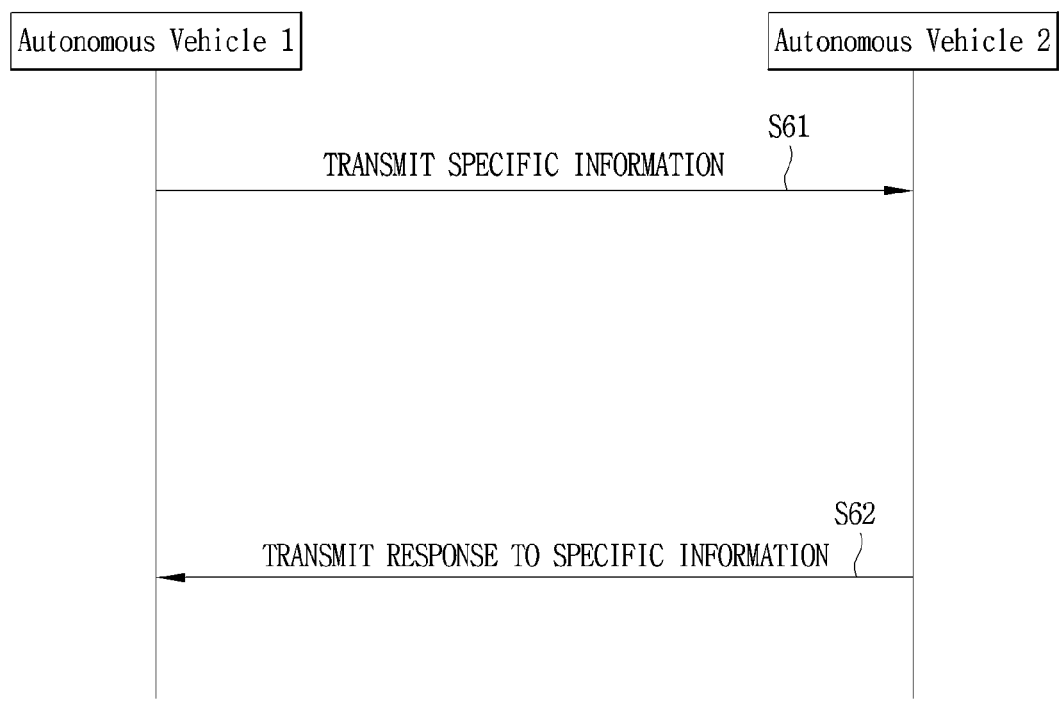
FIG. 4 shows an example of a basic operation between vehicles using 5G communication.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

Figure 5:
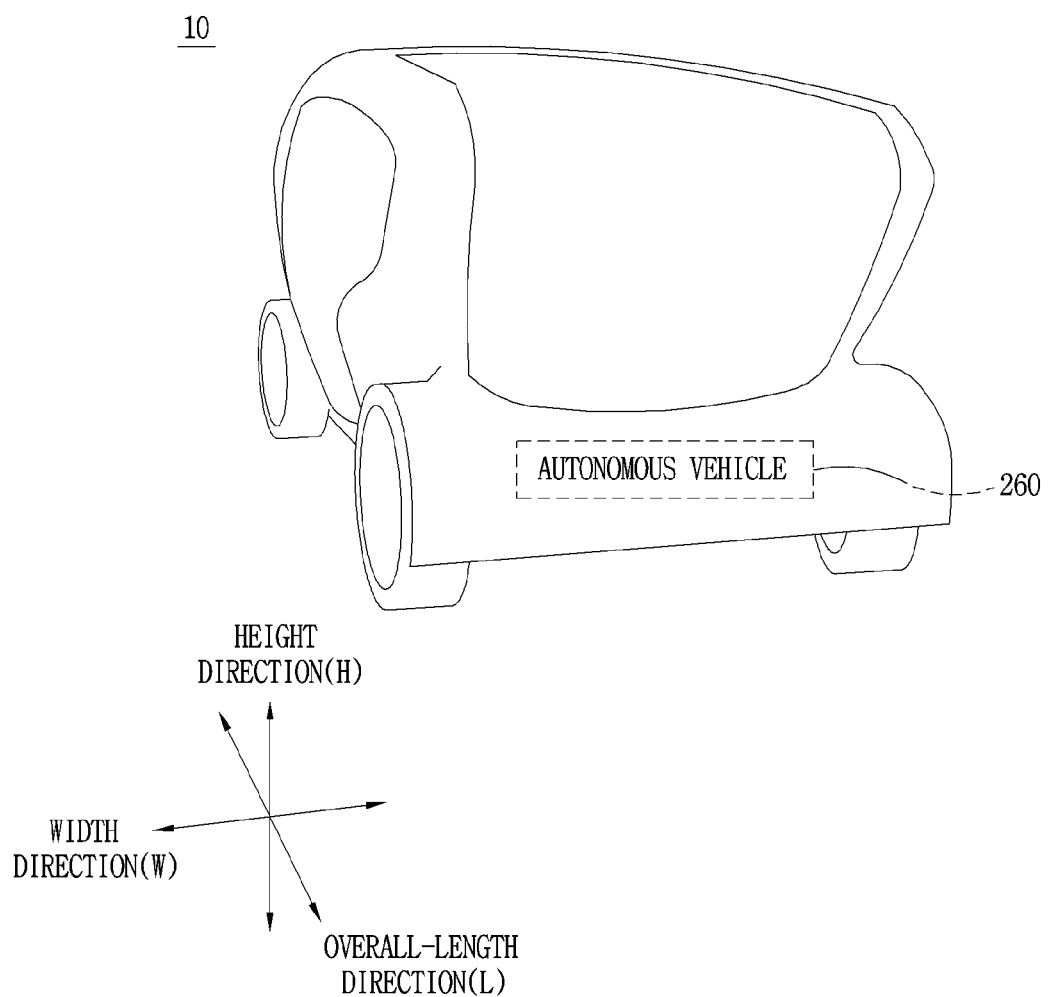
FIG. 5 is a diagram showing a vehicle according to an embodiment of the present disclosure.

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
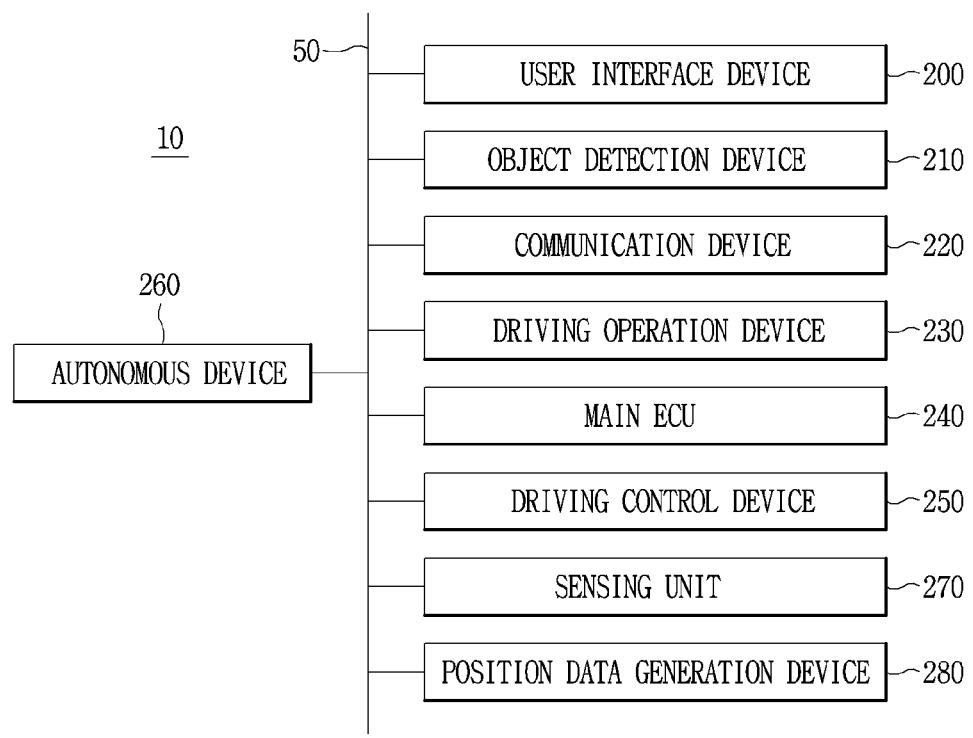
FIG. 6 is a control block diagram of a vehicle according to an embodiment of the present disclosure.

FIG. 6 is a control block diagram of a vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals between one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal), and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
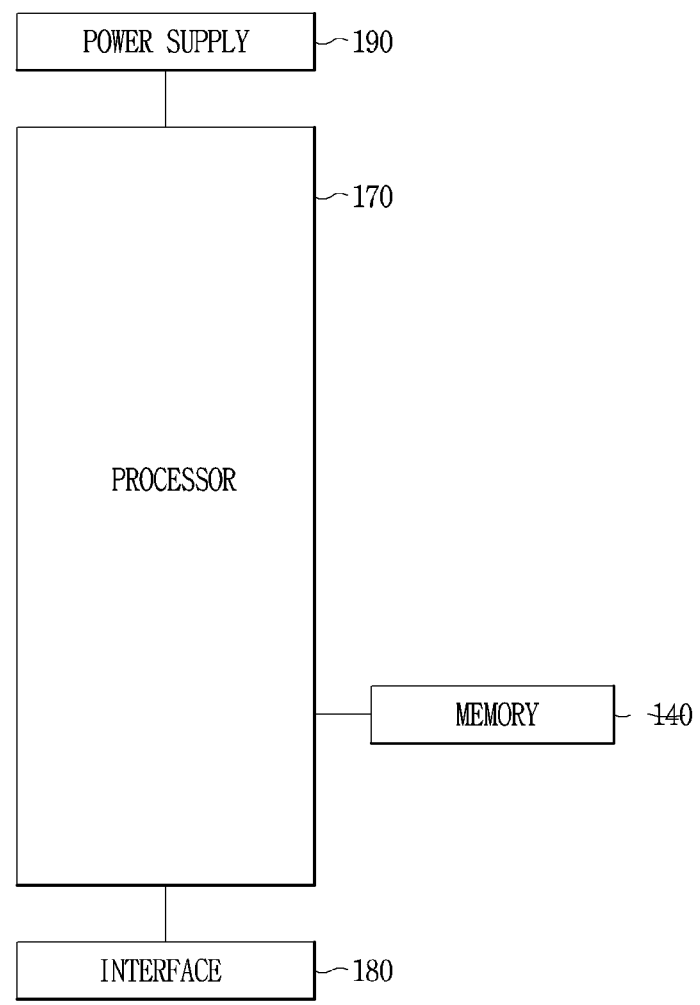
FIG. 7 is a control block diagram of an autonomous device according to an embodiment of the present disclosure.

FIG. 7 is a control block diagram of an autonomous device according to an embodiment of the present disclosure.

Referring to FIG. 7, the autonomous device 260 may include a memory 140, a processor 170, an interface 180, and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

(4) Operation of Autonomous Device

Figure 8:
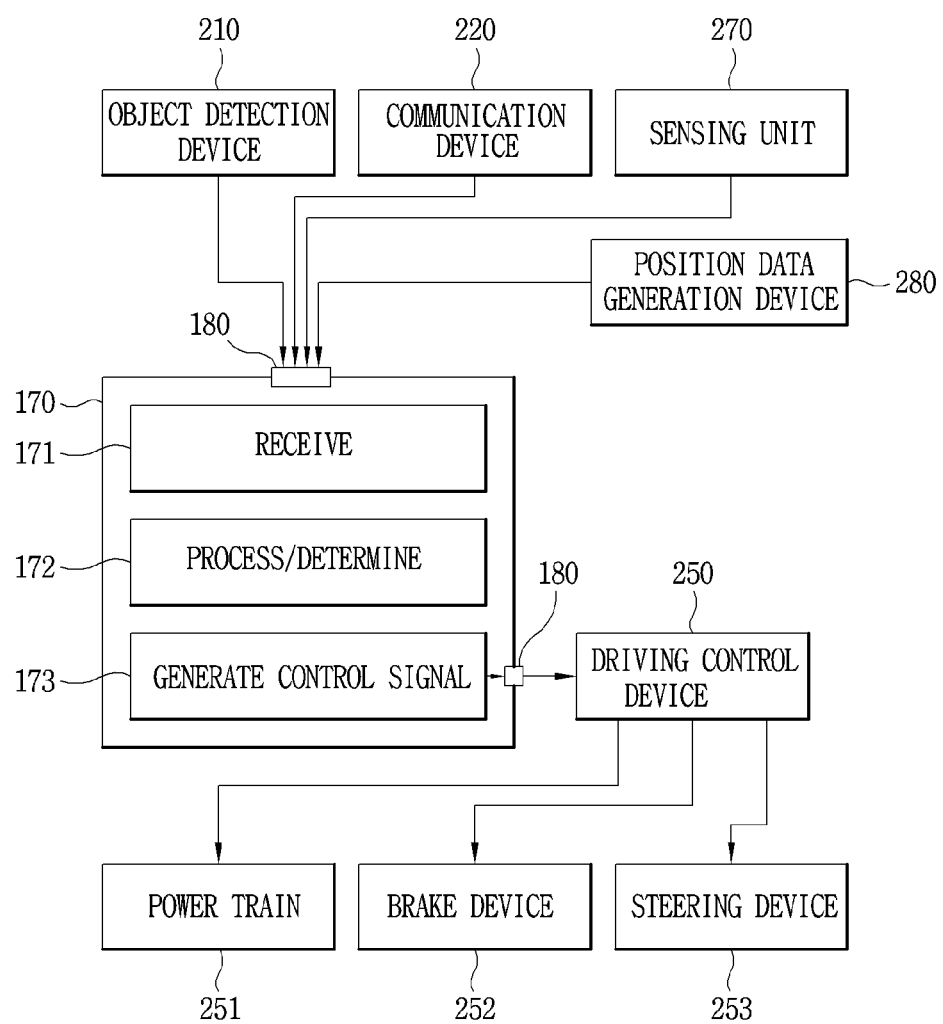
FIG. 8 is a signal flow diagram of an autonomous vehicle according to an embodiment of the present disclosure.

FIG. 8 is a signal flow diagram of an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensor 270 and the position data generation device 280 through the interface 180. The processor 170 can receive object data from the object detection device 210. The processor 170 can receive HD map data from the communication device 220. The processor 170 can receive vehicle state data from the sensor 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 253.

Autonomous Vehicle Usage Scenarios

Figure 9:
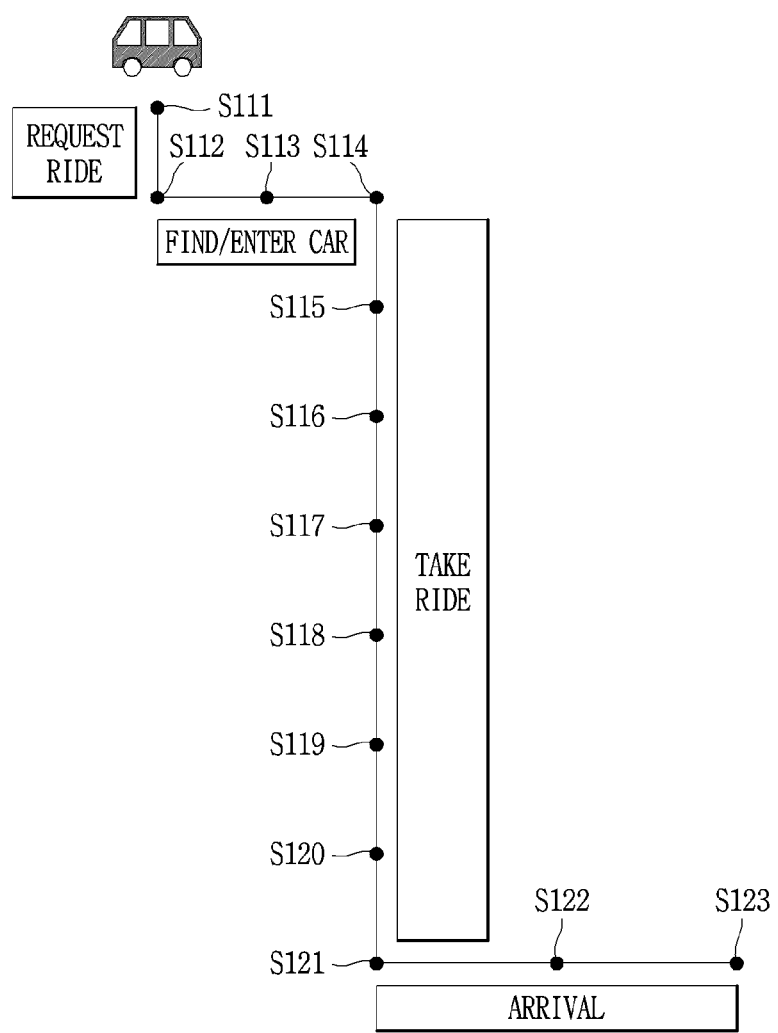
FIG. 9 is a diagram referred to describe a usage scenario of a user according to an embodiment of the present disclosure.

FIG. 9 is a diagram referred to describe a usage scenario of the user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light may be disposed on a floor in the cabin. The cabin system 300 may output the guide light such that the user is seated on the seat, which is already set among the plurality of sheets when user's boarding is detected. For example, a main controller 370 may implement moving light through sequential lighting of a plurality of light sources according to the time from an open door to a predetermined user seat.

4) Seat Adjustment Service Scenario

A fourth scenario S114 is a seat adjustment service scenario. The seat system 360 may adjust at least one element of the seat that matches the user based on the acquired physical information.

5) Personal Content Provision Scenario

A fifth scenario S115 is a personal content provision scenario. A display system 350 can receive personal data of the user via an input device 310 or a communication device 330. The display system 350 can provide a content corresponding to the personal data of the user.

6) Product Provision Scenario

A sixth scenario S116 is a product provision scenario. A cargo system 355 can receive user data through the input device 310 or the communication device 330. The user data may include preference data of the user and destination data of the user. The cargo system 355 may provide a product based on the user data.

7) Payment Scenario

A seventh scenario S117 is a payment scenario. A payment system 365 can receive data for price calculation from at least one of the input device 310, the communication device 330 and the cargo system 355. The payment system 365 can calculate a vehicle usage price of the user based on the received data. The payment system 365 can request the user (that is, a mobile terminal of the user) to pay the calculated price.

8) User Display System Control Scenario

An eighth scenario S118 is a user display system control scenario. The input device 310 may receive a user input configured in at least one form and may convert the user input into an electrical signal. The display system 350 can control a content displayed based on the electrical signal.

9) A1 Agent Scenario

A ninth scenario S119 is a multi-channel artificial intelligence (A1) agent scenario for multiple users. An A1 agent 372 can distinguish the user input of each of multiple users. The A1 agent 372 can control at least one of the display system 350, the cargo system 355, the seat system 360, and the payment system 365 based on the electric signal converted from the user input of each of the multiple users.

10) Multimedia Content Provision Scenario for Multiple Users

A tenth scenario S120 is a multimedia content provision scenario for multiple users. The display system 350 can provide a content that all users can view together. In this case, the display system 350 can individually provide the same sound to multiple users through a speaker provided in each sheet. The display system 350 can provide a content that the multiple users individually can view. In this case, the display system 350 can provide an individual sound through the speaker provided in each sheet.

11) User Safety Securing Scenario

An eleventh scenario S121 is a user safety securing scenario. When vehicle peripheral object information that poses a threat to the user is acquired, the main controller 370 can control to output an alarm of the vehicle peripheral object via the display system 350.

12) Belongings Loss Prevention Scenario

A twelfth scenario S122 is a scenario for preventing loss of belongings of the user. The main controller 370 can obtain data on the belongings of the user via the input device 310. The main controller 370 can obtain user motion data through the input device 310. The main controller 370 can determine whether the user places the belongings and gets off based on the data of the belongings and the motion data. The main controller 370 can control to output an alarm of the belongings through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

Vehicle-to-Everything (V2X)

Figure 10:
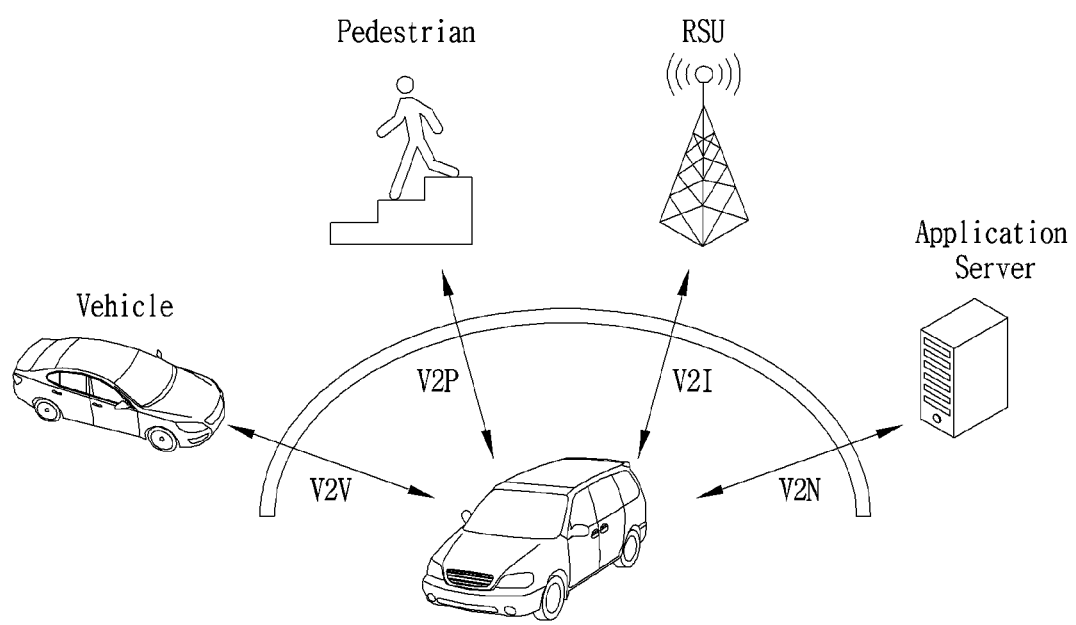
FIG. 10 is an example of V2X communication to which the present disclosure is applicable.

FIG. 10 is an example of V2X communication to which the present disclosure is applicable.

The V2X communication includes communication between a vehicle and all objects such as Vehicle-to-Vehicle (V2V) referring to communication between vehicles, Vehicle-to-Infrastructure (V2I) referring to communication between a vehicle and an eNB or a Road Side Unit (RSU), and Vehicle-to-Pedestrian (V2P) or a Vehicle-to-Network (V2N) referring to communication between a vehicle and a UE with an individual (pedestrian, bicycler, vehicle driver, or passenger).

The V2X communication may indicate the same meaning as V2X side-link or NR V2X, or may include a broader meaning including the V2X side-link or NR V2X.

For example, the V2X communication can be applied to various services such as forward collision warning, an automatic parking system, a cooperative adaptive cruise control (CACC), control loss warning, traffic matrix warning, traffic vulnerable safety warning, emergency vehicle warning, speed warning on a curved road, or a traffic flow control.

The V2X communication can be provided via a PC5 interface and/or a Uu interface. In this case, in a wireless communication system that supports the V2X communication, there may exist a specific network entity for supporting the communication between the vehicle and all the objects. For example, the network object may be a BS (eNB), the road side unit (RSU), a UE, an application server (for example, a traffic safety server), or the like.

In addition, the UE executing V2X communication includes not only a general handheld UE but also a vehicle UE (V-UE), a pedestrian UE, a BS type (eNB type) RSU, a UE type RSU, a robot having a communication module, or the like.

The V2X communication may be executed directly between UEs or may be executed through the network object(s). V2X operation modes can be divided according to a method of executing the V2X communication.

The V2X communication requires a support for UE pseudonymity and privacy when a V2X application is used so that an operator or a third party cannot track a UE identifier within a V2X support area.

Terms frequently used in the V2X communication are defined as follows.

Road Side Unit (RSU): The RSU is a V2X serviceable device that can perform transmission/reception with a moving vehicle using a V2I service. Furthermore, the RSU can exchange messages with other entities supporting the V2X application as a fixed infrastructure entity supporting the V2X application. The RSU is a term often used in the existing ITS specifications, and a reason for introducing this term in 3GPP specifications is to make it easy to read a document in an ITS industry. The RSU is a logical entity that combines a V2X application logic with functions of a BS (referred to as BS-type RSU) or a UE (referred to as UE-type RSU).

V2I service: A type of V2X service in which one is a vehicle and the other is an entity belongs to an infrastructure.

V2P service: A type of the V2X service in which one is a vehicle and the other is a device (for example, handheld UE carried by pedestrian, bicycler, driver, or passenger) carried by an individual.

V2X service: A 3GPP communication service type in which a transmitting or receiving device is related to a vehicle.

V2X enabled UE: A UE supporting the V2X service.

V2V service: A type of the V2X service in which both parties in the communication are vehicles.

V2V communication range: A range of direct communication between two vehicles participating in the V2V service.

As described above, the V2X application referred to as the V2X (Vehicle-to-Everything) includes four types such as (1) Vehicle-to-Vehicle (V2V), (2) Vehicle-to-infrastructure (V2I), (3) Vehicle-to-Network (V2N), and (4) Vehicle-to-Pedestrian (V2P).

Figure 11:
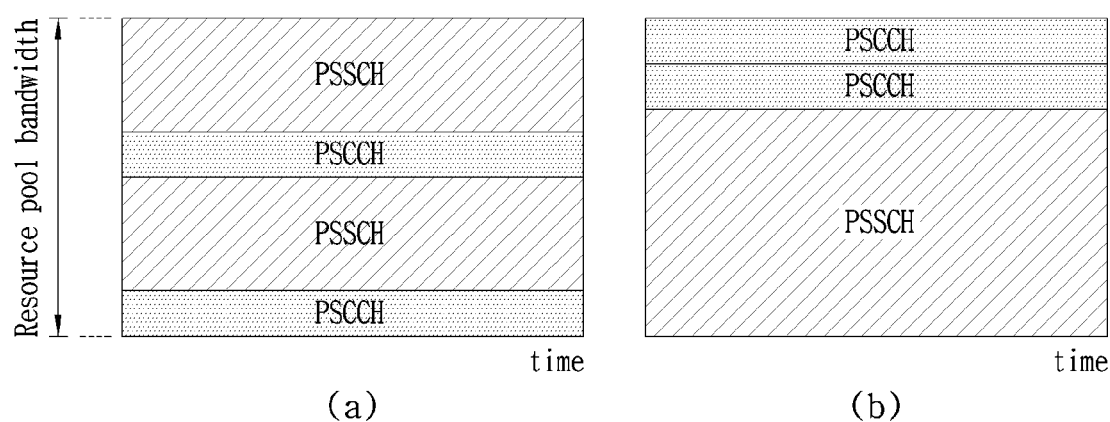
FIG. 11 illustrates a resource allocation method in a side link in which V2X is used.

FIG. 11 illustrates a resource allocation method in a side link in which V2X is used.

In the sidelink, as shown in FIG. 11A, different physical sidelink control channels (PSCCHs) may be spaced from each other and allocated in the frequency domain, and different physical sidelink shared channels (PSSCHs) may be spaced apart from each other and allocated. Alternatively, as shown in FIG. 11B, different PSCCHs may be continuously allocated in the frequency domain, and the PSSCHs may also be continuously allocated in the frequency domain.

NR V2X

The support for V2V and V2X services in LTE is introduced to extend the 3GPP platform to the automotive industry during 3GPP releases 14 and 15.

Requirements for supporting the enhanced V2X use case are largely grouped into four use case groups.

(1) Vehicle Platooning allows vehicles may dynamically form a platoon in which vehicles move together. All the vehicles in the platoon obtain information from a leading vehicle to manage the platoon. This information enables vehicles to drive more harmoniously than normal, go in the same direction and drive together.

(2) Extended sensors may exchange raw or processed data, which are collected via local sensors or live video images, in vehicles, road site units, pedestrian devices, and V2X application servers. Vehicles can increase their environmental awareness more than their sensors can detect. High data rate is one of the main features.

(3) Advanced driving enables semi-automatic or fully-automatic driving. Each vehicle and/or RSU may share its own awareness data obtained from the local sensors with proximity vehicles, and synchronize and coordinate trajectory or maneuver. Each vehicle shares a proximity driving vehicle and a driving intent.

(4) Remote driving enables a remote driver or a V2X application to drive a remote vehicle for passengers who are unable to travel on their own or in a remote vehicle in a hazardous environment. If fluctuations are limited and a route can be predicted as in public transportation, driving based on cloud computing may be used. High reliability and low latency are key requirements.

The 5G communication technology described above may be applied in combination with the methods proposed in the present disclosure to be described later, or may be supplemented to specify or clarify the technical features of the methods proposed in the present disclosure.

Figure 12:
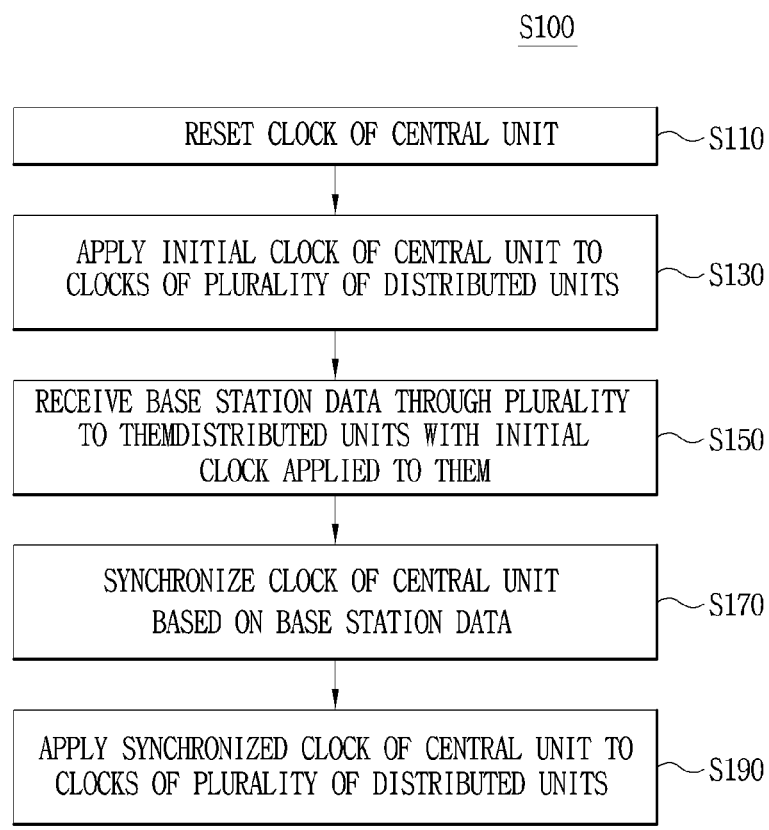
FIG. 12 is a flowchart showing a control method of an autonomous vehicle according to an embodiment of the present disclosure.

FIG. 12 is a flowchart showing a control method of an autonomous vehicle according to an embodiment of the present disclosure.

The control method of the autonomous vehicle illustrated in FIG. 12 may be performed by the first communication device 910 or second communication device 920 of FIG. 1, the autonomous vehicle of FIG. 3, the autonomous vehicle 1 or autonomous vehicle 2 of FIG. 4, the vehicle 10 or autonomous device 260 of FIGS. 5 and 6, the processor 170 of FIGS. 7 and 8, or the vehicle of FIG. 10. For convenience of explanation, an autonomous vehicle will be described as performing the control method of the autonomous vehicle according to the present disclosure, but not necessarily limited thereto. In this regard, a certain electronic device with a distributed antenna system may perform a control method of an electronic device according to the present disclosure. As an example, a certain mobile terminal or user equipment (UE) with a distributed antenna system may perform a control method of a mobile terminal according to the present disclosure.

As illustrated in FIG. 12, a control method S100 of an autonomous vehicle according to an embodiment of the present disclosure includes steps S110 to S190, and a detailed description of this will be given below. Here, the autonomous vehicle may include a plurality of distributed units for receiving data from a base station and a central unit for controlling the plurality of distributed units.

First, the autonomous vehicle may reset the clock of the central unit (S110). That is, after the power is turned ON, the autonomous vehicle may reset a clock included in the central unit to a preset value. That is, the autonomous vehicle may apply an initial clock to the clock of the central unit. That is, the autonomous vehicle may set an initial clock for the clock of the central unit.

Subsequently, the autonomous vehicle may apply the initial clock applied/set for the central unit to clocks of the plurality of distributed units (S130). That is, the autonomous vehicle may send the initial clock applied to/set for the central unit to the plurality of distributed units, and each distributed unit may apply the initial clock sent from the central unit to the clock included in each distributed unit.

Next, the autonomous vehicle may receive data from the base station through the plurality of distributed units with the initial clock applied to them (S150). That is, the autonomous vehicle may receive data from the base station which is an external communication device, by using a plurality of antennas included in each of the plurality of distributed units with the initial clock applied to/set for them. Here, the clock of the base station and the clocks of the plurality of distributed units may not be synchronized. Also, the clock of the base station and the clock of the central unit may not be synchronized. That is, the plurality of clocks (the clock of the central unit and the clocks of the plurality of distributed units) of the autonomous vehicle may be synchronized with the initial clock, whereas the plurality of the clocks of the autonomous vehicle and the clock of the base station may not be synchronized.

Subsequently, the autonomous vehicle may synchronize the clock of the central unit with the clock of the base station based on base station data received through the plurality of distributed units (S170). Here, the autonomous vehicle may acquire a frequency offset between the base station and the autonomous vehicle by using the base station data, acquire the clock of the base station by using the frequency offset, and apply the clock of the base station to the clock of the central unit of the autonomous vehicle.

Next, the autonomous vehicle may apply the clock of the central unit synchronized with the clock of the base station to the clocks of the plurality of distributed units (S190). That is, the central unit may send the clock of the central unit synchronized with the clock of the base station to each distributed unit, and each distributed unit may apply the sent clock of the central unit to the clock of each distributed unit.

Next, the autonomous vehicle may transmit an RF signal for each RF path from each distributed unit to the central unit (S210). Accordingly, the central unit may transmit the RF signal received from each distributed unit to a baseband modem. Thus, the baseband modem may calculate frequency offsets for each RF path (S230). The baseband modem may control an oscillator clock of the central unit on the basis of an average of the frequency offsets (S240).

Next, the autonomous vehicle may determine an operation mode of the baseband modem (S250). When the operation mode of the baseband modem is a tracking mode, an oscillator clock of each distributed unit may be controlled based on frequency offsets for each RF path (S260). On the other hand, when the operation mode of the baseband modem is an acquisition mode, an oscillator clock of the central unit may be transmitted to each distributed unit DU (S190).

Figure 13:
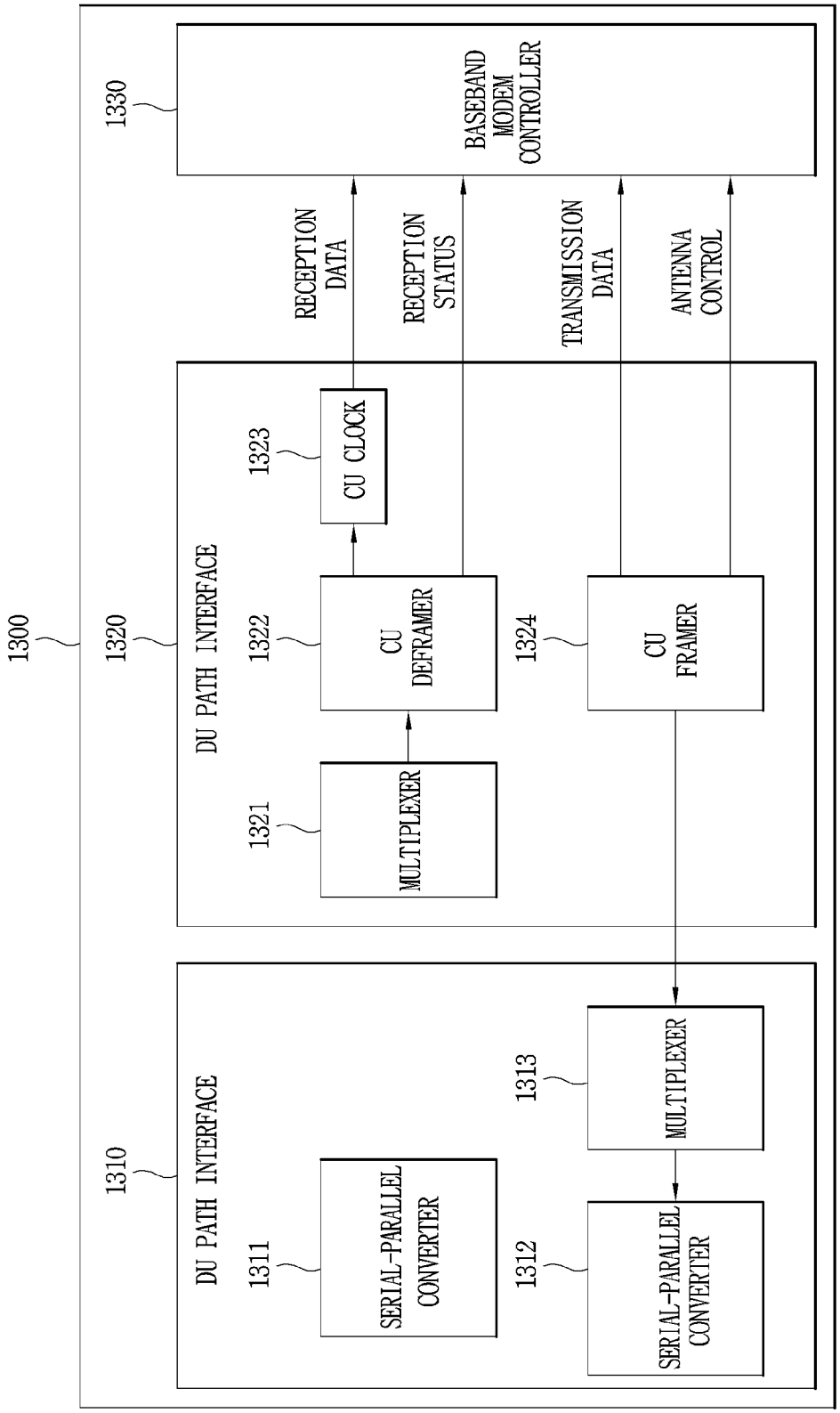
FIG. 13 illustrates an example of a central unit according to an embodiment of the present disclosure.

FIG. 13 illustrates an example of a central unit according to an embodiment of the present disclosure.

In a case where a system for cellular communication is installed in an autonomous vehicle, the performance and reliability of wireless communication may be improved by distributing a plurality of units each including an antenna.

A cellular communication system (autonomous driving system) that implements a plurality of distributed units (distributed antennas) may include one central unit CU and a plurality of distributed units DU depending on where it is implemented.

Here, each distributed unit includes an antenna for sending and receiving radio frequency (RF) signals and an additional circuit connected to the antenna. Here, the central unit includes a digital baseband modem (digital baseband modem controller) and an additional circuit connected to it. For example, a variety of methods of implementation may be employed depending on the purpose of implementation of the communication system, apart from the antennas of the distributed units and the digital baseband modem of the central unit.

Here, an autonomous vehicle may include N distributed units for minimizing shadow areas for transmission and reception, and each distributed unit may exist in a distributed position. The digital baseband modem in the central unit may support M radio frequency (RF) paths in consideration of costs for implementing a transmission/reception circuit, where N>=M.

FIGS. 13 to 16 propose a structure of an autonomous vehicle that achieves maximum wireless communication performance and stability while keeping the number of distributed units and the number of wireless frequency paths to a minimum.

As illustrated in FIG. 13, the central unit (CU) 1300 of the autonomous vehicle may include a DU path interface 1310, a CU path interface 1320, and a baseband modem controller 1330. Here, operation clocks of the DU path interface, the CU path interface, and the baseband modem controller need to be synchronized for proper data transmission and reception. Also, the clock of the autonomous vehicle (or UE) needs to be synchronized with the clock of the base station. That is, the autonomous vehicle may send and receive data properly after performing clock synchronization with the base station.

The DU path interface may include a serial-parallel converter 1311 and 1312 for sending and receiving an interface signal to and from a distributed unit. Also, the DU path interface may include a multiplexer 1313 for multiplexing transmission data transmitted via a CU path interface from the baseband modem controller.

The CU path interface may include a multiplexer 1321 for multiplexing reception data transmitted via a DU path interface. Also, the CU path interface may include a CU deframer 1322 for deframing reception data multiplexed by the multiplexer. Also, the CU path interface may include a CU clock 1323 (or CU data recovery block) for synchronization with the clock of the base station based on reception data transmitted from the CU deframer. Also, the CU path interface may include a CU framer 1324 for framing transmission data transmitted from the baseband modem controller and an antenna control signal.

The baseband modem controller may receive reception data and a reception status from the CU path interface. The baseband modem controller may send transmission data and an antenna control signal to the DUs via the CU path interface and the DU path interface.

Figure 14:
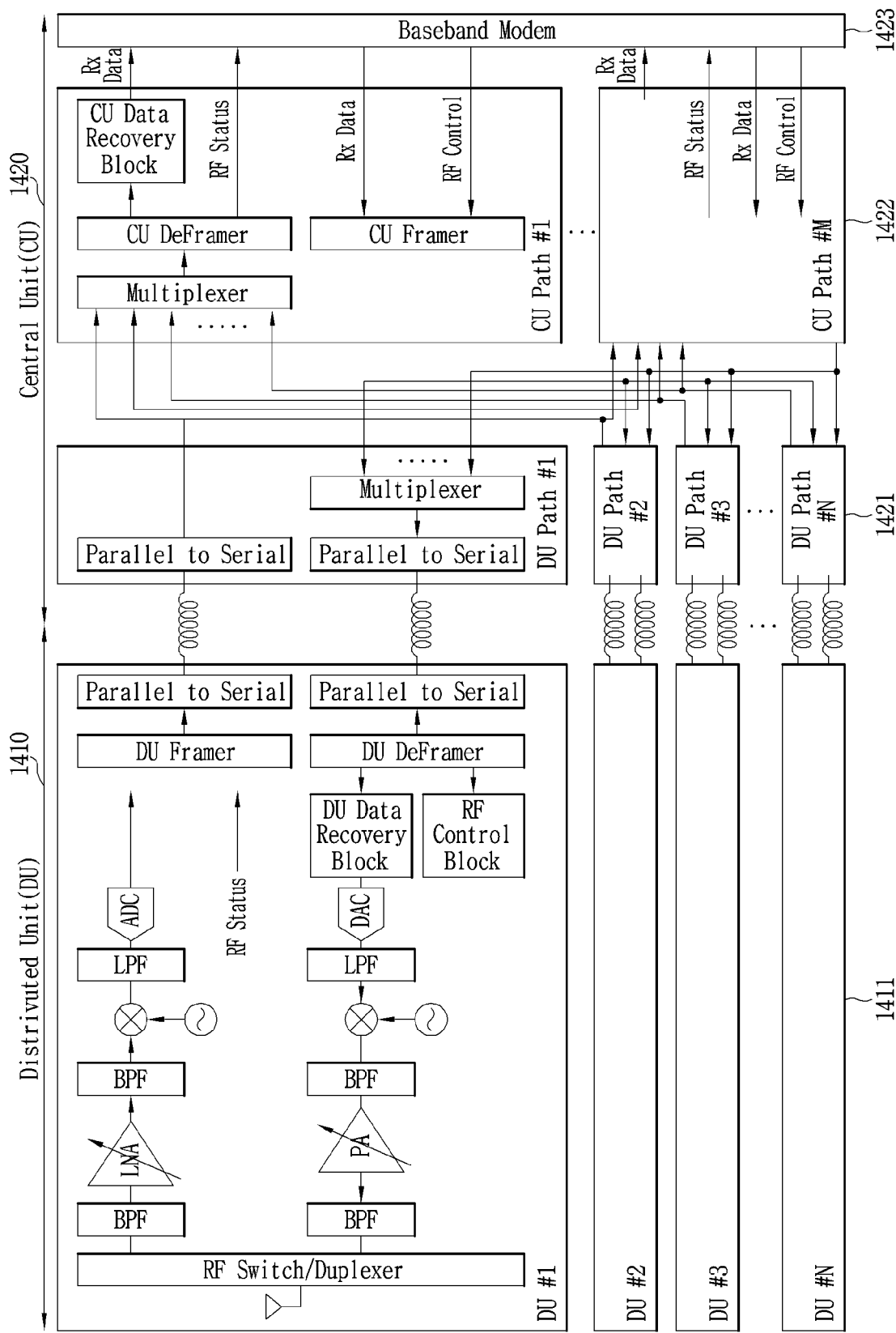
FIG. 14 illustrates one example of a communication module according to an embodiment of the present disclosure.

FIG. 14 illustrates one example of a communication module according to an embodiment of the present disclosure.

As illustrated in FIG. 14, a communication module of an autonomous vehicle according to an embodiment of the present disclosure may include a central unit 1420 and N distributed units 1410. Here, the communication module including the central unit and the N distributed units may include at least one of the above-described components: the Tx processor 912, Rx processor 913, Tx/Rx RF module 915, the antenna 916, the TX processor 922, the Rx processor 923, and the Tx/Rx RF module 925, and the antenna 926. Also, the communication module may be the communication device 220 of FIGS. 6 and 7. Particularly, each distributed unit may include the antennas of FIG. 1.

The central unit may include N DU path interfaces 1421 (DU Path #1, DU Path #2, . . . , DU Path #N) which exchange an interface with each of the N distributed units 1411. Each DU path interface may be serially connected to each distributed unit, and each DU path interface may be connected in parallel.

The central unit may include M CU path interfaces 1422 (CU Path #1, CU Path #2, . . . , CU Path #N) which send and receive transmission data and/or reception data from the N DU path interfaces. Each CU path interface may receive transmission data from the baseband modem 1423 and send it to the distributed units via the DU path interfaces, and may receive reception data from the distributed units via the DU path interfaces and send it to the baseband modem 1423.

Here, each distributed unit may include an antenna RF, and each antenna may be supplied with clocks from a voltage controlled temperature compensated crystal oscillator (VC-TCXO). Here, VC-TCXO may be synchronized with the operation clock of the base station based on a control signal from the antenna or the baseband modem.

FIG. 14 is a block diagram of a communication module showing a distributed antenna structure. An overall system corresponding to a distributed antenna system may include one CU and N DUs. In the distributed antenna system, each block including an RF-DU and a CU-baseband modem needs to share their operation clocks with each other for proper data transmission/reception. Also, the UE needs to be synchronized with the operation clock of the base station, and the present disclosure proposes a method of operation clock synchronization between the UE and the base station. In a system proposed in the present disclosure, a clock for overall system operation in the CU may be generated by VCXO, and VCXO may be controlled by the baseband modem. The CU and the DUs are connected by a high speed serial interface, and may exchange RF data, control data, and clock information via this interface. For proper data transmission/reception to and from the base station, the operation clock of the UE needs to be synchronized with the clock of the base station. When an RF block operates based on a synchronized clock, data may be received and sent properly. Also, when an RF block operates based on a synchronized clock, data reception performance may be improved.

Figure 15:
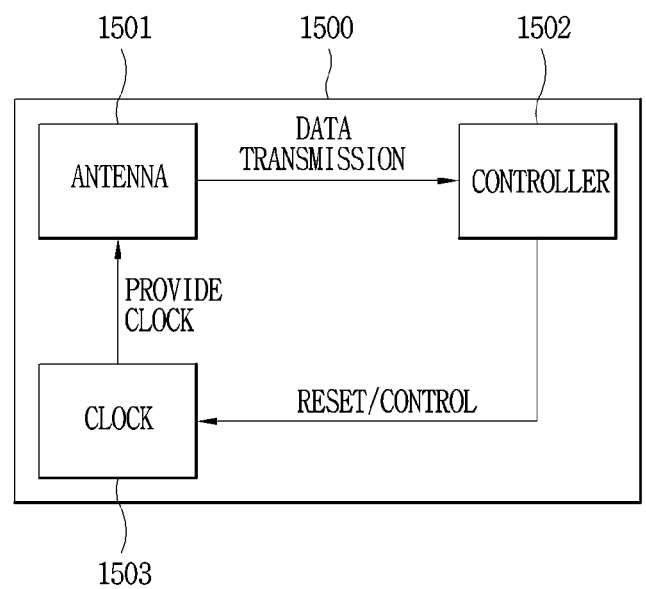
FIG. 15 is a block diagram illustrating another example of a communication module according to an embodiment of the present disclosure.

FIG. 15 is a block diagram illustrating another example of a communication module according to an embodiment of the present disclosure.

As illustrated in FIG. 15, the communication module 1500 may include a central unit and a distributed unit, and the central unit and the distributed unit may include an antenna 1501, a controller 1502, and a clock 1503.

First, the antenna may receive external data and send the received data to the controller. Here, the antenna may be included in the distributed unit.

The controller may reset the clock or control the clock based on received data. Here, the controller may be included in the central unit.

The clock may change/set the clock value according to a control signal from the controller and provide the changed/set clock value to the antenna. Here, the clock may be included in both the central unit and the distributed unit.

Figure 16:
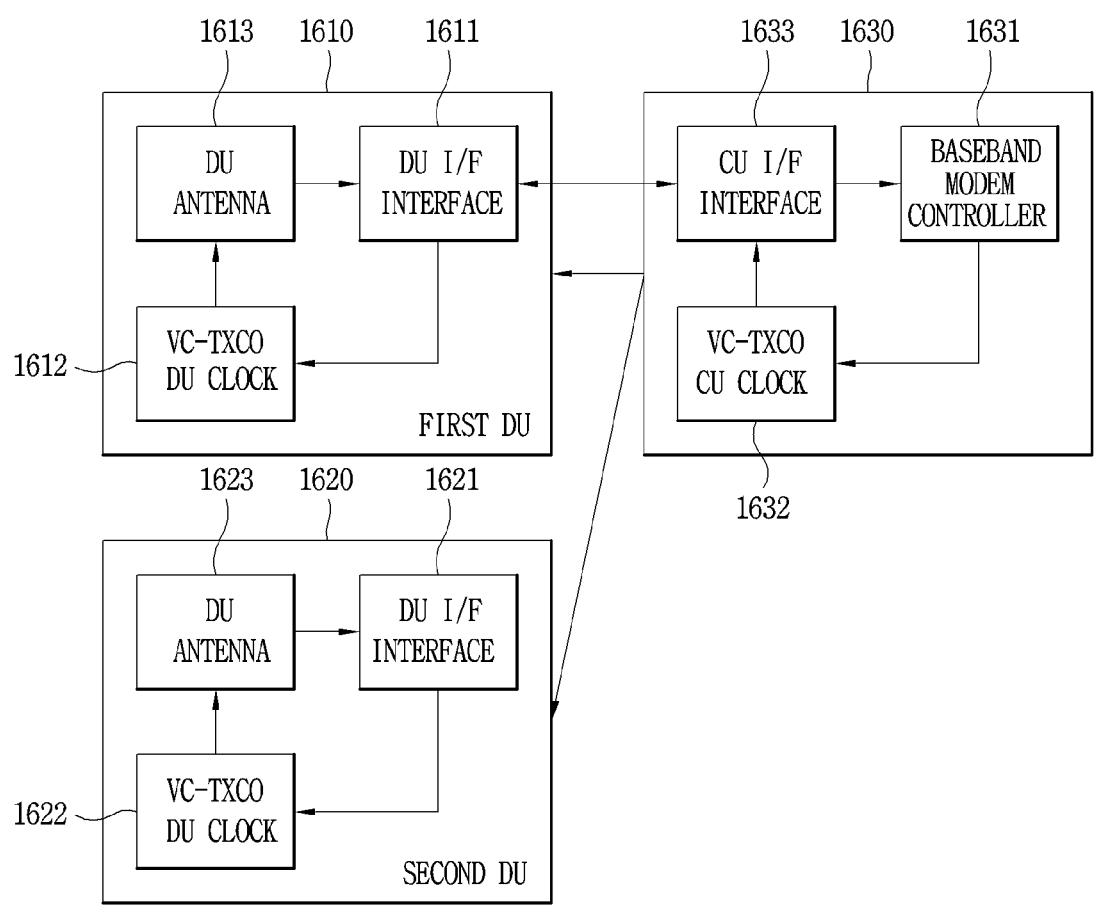
FIG. 16 is a block diagram illustrating yet another example of a communication module according to an embodiment of the present disclosure.

FIG. 16 is a block diagram illustrating yet another example of a communication module according to an embodiment of the present disclosure.

As illustrated in FIG. 16, a communication module of an autonomous vehicle may include a central unit 1630, a first distributed unit (first DU) 1610, and a second distributed unit (second DU) 1620.

A CU I/F interface 1633 of the central unit may transmit base station data transmitted from each distributed unit to the baseband modem controller 1631.

The baseband modem controller of the central unit may reset a VC-TXCO CU clock 1632.

The baseband modem controller may have the VC-TXCO CU clock synchronized with the clock of the base station by using base station data transmitted via the CU I/F interface from each distributed unit.

The baseband modem controller of the central unit may transmit information related to the clock of the base station to each distributed unit via the CU I/F interface.

The VC-TXCO CU clock 1632 of the central unit may provide an applied clock to the CU I/F interface.

A DU I/F interface 1611 and 1621 of each distributed unit may apply a transmitted clock value of the base station to a VC-TXCO DU clock 1612 and 1622.

The VC-TXCO DU clock of each distributed unit may provide an applied clock to a DC antenna 1613 and 1623 of each distributed unit.

The DU antenna of each distributed unit may receive base station data according to a clock synchronized with the base station.

Here, the DU I/F interface and the CU I/F interface may be connected by a high speed serial interface. For example, the high speed serial interface may be 10 gbE Ethernet. Since a 10 GbE Ethernet interface performs packet-based communication, it is easier to map base station data and clock-related information to a packet. Also, this interface makes data recovery and clock recovery easier. The central unit may transmit data and clock-related information to each distributed unit by using a reference clock of the 10 GbE interface generated by the VC-TCXO CU clock. Each distributed unit may control such that the VC-TCXO DU clock in the distributed unit is synchronized with the clock of the central unit by using clock information received from the 10 GbE interface.

For example, the central unit may define a protocol for sending data and clock-related information together to the high speed serial interface, and may transmit data and clock-related information to the distributed units based on the defined protocol. In such a system configuration, a plurality of distributed units may be connected to each central unit, and the baseband modem controller of the central unit may select part of data signals received from the plurality of distributed units, analyze the selected signals, and calculate a clock offset with the base station. Next, the baseband modem controller may adjust the VC-TCXO CU clock included in the central unit by as much as the calculated clock offset, and the clock of the central unit may be transmitted to each distributed unit via the CU I/F interface and the DU I/F interface.

In a distributed antenna system proposed in the present disclosure, a clock for overall system operation is generated in the CU by VCXO, and VCXO is controlled by the baseband modem 1631. The CU and the DUs may be connected by a high speed serial interface DU I/F, and may exchange RF data, control data, and clock information via this interface. The system p proposed in the present disclosure may use 10 GbE Ethernet as a high speed serial interface between the CU and the DUs. Since an Ethernet interface performs packet-based communication, it is easier to map RF data and control data to a packet. In this regard, the Ethernet interface makes data and clock recovery easier.

The CU may send data to the DUs by using a reference clock of the 10 GbE interface generated by VCXO. Also, the DUs control the VCXO in the DUs so as to be synchronized with the clock of the CU by using clock information received from the 10 GbE interface. In some applications, various protocols for sending both data and clock information to the high speed serial interface may be defined and used. In such a system configuration, a plurality of DUs may be connected to each CU. Also, the baseband modem may calculate a clock offset with the base station by selecting an RF signal received from the plurality of DUs and analyzing the signal. The VCXO in the CU may be adjusted by as much as the calculated clock offset, and CU clock information is transmitted to each DU via a CU-DU interface so that the operation clock frequency of the RF block.

In order to perform the above-described clock synchronization method, referring to FIG. 16, a distributed antenna system including a first distributed unit (first DU) 1610, a second distributed unit (second DU) 1620, and a central unit 1630 may be implemented.

Each block including an RF-DU and a CU-baseband modem in the distributed antenna system needs to share their operation clocks in order to send and receive data properly. In this regard, the UE needs to be synchronized with the operation clock of the base station, and such a synchronization method will be proposed. In the proposed system, clocks for overall system operation in the CU are generated by VCXO, and VCXO is controlled by the baseband modem. The CU and the DUs may be connected by a high speed serial interface, and exchange RF data, control data, and clock information via this interface.

For proper data transmission/reception with the base station, the operation clock of the UE needs to be synchronized with the clock of the base station. For proper data reception and transmission, the RF block is required to operate based on the synchronized clock. Also, data transmission/reception performance may be improved when the RF block operates based on the synchronized clock.

In a structure where an RF and a baseband modem are directly connected, each Rx data may be transmitted through the same RF device. Thus, no clock offset is generated between RX data paths. However, an instantaneous difference may occur between clocks for running each RF device. Accordingly, a sampling frequency error and a timing error may be generated between RX data paths, thereby degrading the reception performance of the baseband modem.

More specifically, an instantaneous clock offset may occur between each DU due to clock synchronization operations of independent DUs in the distributed antenna system. Thus, in the comparison of modem reception performance, a communication performance degradation may occur in the distributed antenna system at a high modulation codling scheme (MCS) level. Such a communication performance degradation in the distributed antenna system occurs because the operation clocks of RF units operating on two or more DUs are not in exact synchronization instantaneously. Accordingly, a sampling frequency error and a time tracking error may occur for each path in reception data in the baseband modem.

Figure 17:
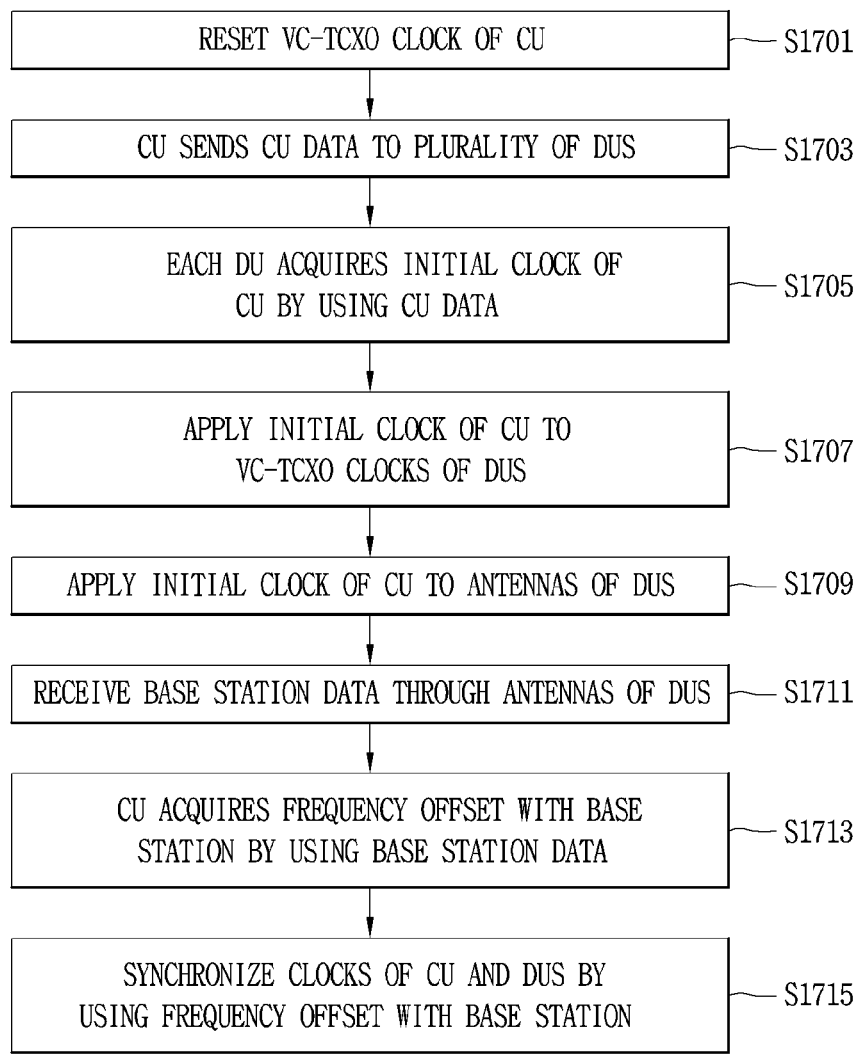
FIG. 17 is a flowchart illustrating one concrete example of a clock synchronization method for an autonomous vehicle.

FIG. 17 is a flowchart illustrating one concrete example of a clock synchronization method for an autonomous vehicle.

As illustrated in FIG. 17, first, the autonomous vehicle may reset a VC-TCXO clock of the CU (central unit) (S1701).

Subsequently, in the autonomous vehicle, the CU may send CU data to the plurality of DUs (distributed units) (S1703). Here, the CU data may include data related to a reset clock.

Next, in the autonomous vehicle, each DU may acquire an initial clock of the CU by using the CU data (S1705).

Subsequently, the autonomous vehicle may apply the initial clock of the CU to VC-TCXO clocks of the DUs (S1707). For example, each DU may calculate a frequency offset between the clock of VC-TCXO in the DU and a clock sent from the CU, and may adjust the frequency of the VC-TXCO clock in the DU by using the calculated frequency offset, so that the frequency of the VC-TXCO clock in the DU and the frequency of the clock of VC-TXCO of the CU are the same.

Next, the autonomous vehicle may apply the initial clock of the CU to antennas of the DUs (S1709).

Subsequently, the autonomous vehicle may receive base station data through the antennas of the DUs (S1711).

Next, in the autonomous vehicle, the CU may acquire a frequency offset with the base station by using the base station data (S1713).

Subsequently, the autonomous vehicle may synchronize the clocks of the CU and the DUs with the clock of the base station by using the frequency offset with the base station (S1715). For example, the baseband modem controller of the CU may adjust the frequency of the clock of VC-TCXO of the CU so that the difference between the clock frequency of the base station and the clock frequency of VC-TCXO of the CU becomes zero.

Figure 18:
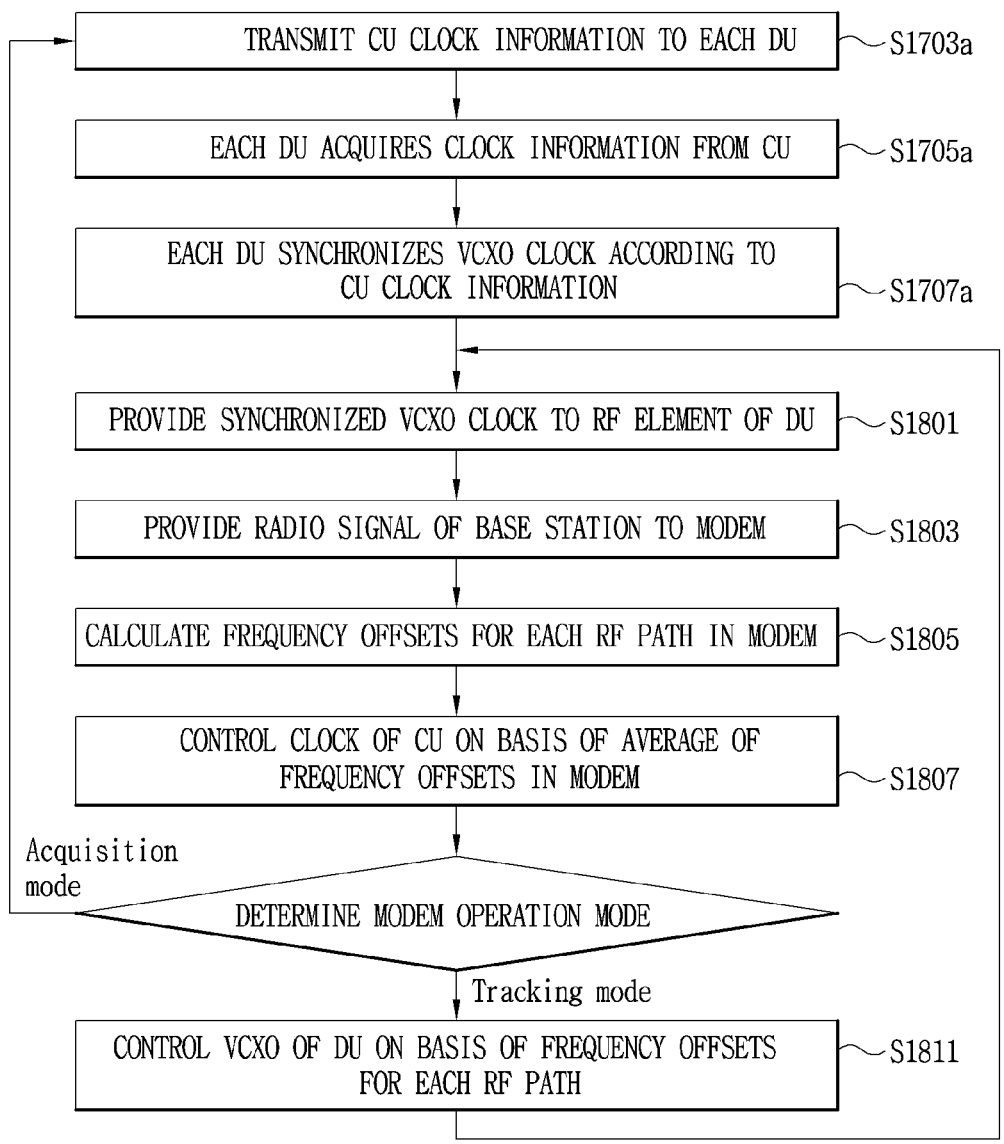
FIG. 18 is a flowchart illustrating one concrete example of a clock synchronization method for an autonomous vehicle.

FIG. 18 is a flowchart illustrating one concrete example of a clock synchronization method for an autonomous vehicle.

In the distributed antenna system structure, the clocks of each RF unit and distributed unit DU need to be synchronized. In this regard, clock information is extracted from data transmitted from the central unit CU to control VCXO of DU to operate for clock synchronization. In this case, there may be a minute clock difference between each DU generated by the clock synchronization operation of each independent DU, which may create a sampling error in Rx IQ data.

The difference in delay offset between an analog input signal transmitted through an antenna from one RF device and a digital out put signal transmitted to the baseband mode is not significant. However, in a distributed antenna system using physically different RF devices, a time offset between Rx data paths caused by an instantons clock offset between DUs may cause a degradation in modem reception performance. Particularly, higher performance degradation may occur in a high MCS (modulation coding scheme) situation.

To solve this issue, a clock synchronization method for an autonomous vehicle proposed in the present disclosure may be performed as follows.

Frequency errors may be calculated individually for each Rx data path, and the VCXO of each DU side may be individually controlled according to the operation mode (operation step) of the baseband modem.

To solve a time offset generated for each RF device by an instantaneous clock offset of each DU, time tracking may be individually performed for each Rx data path.

In this regard, referring to FIG. 18, each step of FIG. 18 may be performed after the synchronization (S1715) of the clocks of the central unit CU and the distributed units DU with the clock of the base station, but not limited thereto.

Referring to FIGS. 13 to 18, the autonomous vehicle may transmit an RF signal for each RF path from each distributed unit DU to the central unit CU (S1801). For example, the step S1801 of transmitting an RF signal for each RF path from each distributed unit DU to the central unit CU may correspond to the step S210 of FIG. 12. Thus, the central unit CU may transmit an RF signal received from each distributed unit DU to the baseband modem.

The autonomous vehicle may transmit a signal received from each DU, for example, Rx data, to the baseband modem (S1803). Specifically, the autonomous vehicle may transmit a radio signal from the base station to the baseband modem via a DU-CU interface through an RF device.

In the autonomous vehicle, the baseband modem may calculate frequency offsets for each RF path (S1805). For example, the step (S1805) of calculating frequency offsets for each RF path in the baseband modem may correspond to the step S240 of FIG. 12. To this end, the baseband modem may select and receive an RF signal of each DU coming through the CU. The baseband modem may calculate a frequency offset with the clock of the base station by analyzing an amount of change in phase of I/Q data received for each Rx path.

In the autonomous vehicle, the baseband modem may control an oscillator clock of the central unit CU on the basis of an average of the frequency offsets (S1807). For example, the step of controlling an oscillator clock of the central unit CU on the basis of an average of the frequency offsets may correspond to the step S240 of FIG. 12. The baseband modem may control VCXO of the CU by a sum of frequency errors for each Rx path. Referring to FIG. 16, the baseband modem 1631 may control VCXO 1632 of the CU 1630 by a sum of frequency errors for each Rx path.

The autonomous vehicle may determine an operation mode of the baseband modem (S1809). For example, the step S1809 of determining an operation mode of the baseband modem may correspond to the step S250 of FIG. 12. It is possible to check whether the operation mode of the baseband modem is an acquisition mode or a tracking mode.

In the step S1809 of determining an operation mode of the baseband modem, it is possible to determine whether the baseband modem has performed cell search or not. Here, whether cell search has been performed or not may be associated with whether the cell search S201 of FIG. 2 has been performed or not.

Thus, upon determining that the baseband modem has performed cell search, it may be determined that the operation mode of the baseband modem is the tracking mode. On the other hand, upon determining that the operation mode of the baseband modem is performed before the cell search, it may be determined that the operation mode of the baseband modem is the acquisition mode.

For another example, the step S1809 of determining an operation mode of the baseband modem may be associated with whether a physical broadcast channel (PBCH) has been successfully received. Here, the successful reception of PBCH may be associated with the PBCH reception and system information acquisition of FIG. 2. Thus, in the step S1809 of determining an operation mode of the baseband modem, it is possible to determine whether a physical broadcasting channel (PBCH) has been successfully received or not. That is, in the step S1809 of determining an operation mode of the baseband modem, it is possible to determine whether system information has been acquired or not.

In this regard, if PBCH has been successfully received, the autonomous vehicle may determine that the operation mode of the baseband modem is the tracking mode. If new system information has been acquired through PBCH, the autonomous vehicle may determine that the operation mode of the baseband modem is the tracking mode. On the other hand, if PBCH has not been successfully received, it may be determined that the operation mode of the baseband modem is the acquisition mode. If new system information has not been acquired through PBCH, the autonomous vehicle may determine that the operation mode of the baseband modem is the acquisition mode. That is, the autonomous vehicle may perform the acquisition mode in order to acquire new system information through PBCH.

When the operation mode of the baseband modem is the tracking mode, the autonomous vehicle may control oscillator clocks of each distributed unit on the basis of the frequency offsets for each RF path (S1811). For example, the step S1811 of controlling oscillator clocks of each distributed unit on the basis of the frequency offsets for each RF path may correspond to the step S260 of FIG. 12.

Referring to FIG. 14, oscillator (VCXO) clocks of each distributed unit DU #1 and DU #2 to DU #N on the basis of the frequency offsets for each RF path. Accordingly, frequencies outputted from the oscillators VCXO in each distributed unit DU #1 and DU #2 to DU #N may differ from each other. By differently adjusting the oscillation frequencies in each distributed unit DU #1 and DU #2 to DU #N, synchronization errors between signals inputted into the multiplexer of the central unit may be compensated for.

For example, by differently adjusting the oscillation frequencies in each distributed unit DU #1 and DU #2 to DU #N, synchronization errors between signals transmitted to the baseband modem 1423 through every central unit CU #1 and CU #2 to CU #N may be compensated for. For another example, synchronization errors between signals transmitted through some of M CU paths may be compensated for by differently adjusting the oscillation frequencies in each distributed unit DU #1 and DU #2 to DU #N.

The number of signal streams transmitted through some of M CU paths may be associated with multiple input multiple output (MIMO) mode. Meanwhile, the number of signal streams transmitted through some of N DU paths may be associated with the multiple input multiple output (MIMO) mode and a diversity mode. For example, if a signal is received through one central unit CU and two distributed units DU, the distributed antenna system may operate in the diversity mode in which the same data is received through different signals. However, if a signal is received through one central unit CU and two distributed units DU, the distributed antenna system may operate in the MIMO mode. In the MIMO mode, different data may be received through different signals. In this case, different data may be simultaneously received and provided to the multiplexer. For another example, upon receiving a signal through two central units CUs and two distributed units DUs, it may be the MIMO mode in which different data is received through different signals.

There is a need to extract frequency offsets for each RF path in order to differently adjust the oscillation frequencies in each distribution unit DU #1 and DU #2 to DU #N. In this regard, in the step S1811 of controlling oscillator clocks of each distributed unit DU on the basis of the frequency offsets for each distributed unit DU, oscillator clock errors of each distributed unit DU may be individually controlled to have different values. After the step S1811 of individually controlling oscillator clocks of each distributed unit DU, a series of steps for synchronization may be performed for each distributed system.

After the step S1811 of controlling oscillator clocks of each distributed unit, the autonomous vehicle may perform the step S1801 of transmitting an RF signal for each RF path from each distributed unit DU to the central unit CU. To this end, in the autonomous vehicle, the baseband modem may synchronize clocks by directly controlling VCXO of each DU through a CU-DU interface by using frequency errors of each RX path. Also, the autonomous vehicle may provide individually controlled oscillator clocks as reference clocks to RF devices.

Referring to FIG. 14, the autonomous vehicle or the distributed antenna system may provide individually controlled oscillator clocks to RF devices in each distributed unit DU #1 and DU #2 to DU #N. The individually controlled oscillator clocks may be provided to amplifiers LNA and PA, apart from the oscillators VCXO in the DUs. The individually controlled oscillator clocks may be provided to an RF control block. Also, the individually controlled oscillator clocks may be provided to a DU data recovery block, and provided to digital components apart from the RF devices.

In this regard, the autonomous vehicle provides an individually controlled first clock as a reference clock to an RF device. Frequency offsets for each RF path may be extracted in order to differently adjust oscillation frequencies in each distribution unit DU #1 and DU #2 to DU #N. For synchronization between digital signals of each distributed unit DU #1 and DU #2 to DU #N, a time offset may be extracted for each Rx path at the rear of DAC or ADC. In this regard, if a time offset for each Rx path at the rear of DAC or ADC is less than or equal to a reference value, synchronization may be performed in consideration of frequency offsets for each RF path alone. Alternatively, the communication performance (e.g., BER and BLER) in the baseband modem may be determined by performing synchronization in consideration of frequency offsets for each RF path alone. If the communication performance is less than or equal to a reference value, synchronization may be performed in consideration of both the frequency offsets for each RF path and the time offsets for each Rx path at the rear of DAC or ADC.

Moreover, the autonomous vehicle may perform the step S1803 of providing a radio signal from the base station to the baseband modem via a DU-CU interface through an RF device may be performed.

After the step S1803 of providing a radio signal from the base station to the baseband modem, the autonomous vehicle may further perform the step S1807 of calculating frequency offsets for each RF path in the baseband modem with respect to the radio signal from the base station. The step S1807 of calculating frequency offsets may include calculating frequency offsets with the clock of the base station based on the in-phase component and quadrature phase component of a signal received for each RF path.

On the other hand, when the operation mode of the baseband modem is the acquisition mode, the autonomous vehicle may transmit an oscillator clock of the central unit CU to each distributed unit DU (S1703a). That is, the VCXO clock of the CU is transmitted to each DU via a CU-DU interface, and the VCXO clock of each DU is synchronized and supplied as a reference clock to an RF device. In this regard, the step S1703a of transmitting an oscillator clock of the central unit CU may correspond to the step S1703 of transmitting CU data to a plurality of DUs (distributed units) from the CU as shown in FIG. 17.

The autonomous vehicle may individually control oscillator clock errors of each distributed unit DU to have different values. Accordingly, the autonomous vehicle may provide an autonomous driving system synchronized for each distributed system by compensating for clock errors, frequency errors, and path errors for every RF path.

The autonomous vehicle may control oscillator clock errors of each distributed unit DU to be the same value in the acquisition mode. Accordingly, the autonomous vehicle may provide a synchronized autonomous driving system in consideration of the overall distributed system.

After the step S1703a of transmitting oscillator clocks of the central unit CU to each distributed unit DU, the autonomous vehicle may perform a series of steps related to synchronization in consideration of the overall distributed system.

The autonomous vehicle may allow each distributed unit DU to acquire clock information from data received from the central unit CU (S1705a). Accordingly, each distributed unit DU may recover an initial clock so as to correct a clock error. The step S1705a of acquiring clock information of the central unit CU may correspond to the step S1705 of acquiring an initial clock of the CU by each DU by using CU data as shown in FIG. 17. Also, the autonomous vehicle may perform the step S1707a of synchronizing an oscillator clock of the DU by each distributed unit DU, based on a difference between the oscillator clock of the DU and the oscillator clock of the CU. For example, the step S1707a of synchronizing the oscillator clock of the DU by each distributed unit DU may correspond to the step S1707 of applying an initial clock of the CU to the VC-TCXO clock of DU as shown in FIG. 17.

The autonomous vehicle may provide a synchronized oscillator clock as a reference clock to an RF device of the DU (S1801). Also, the autonomous vehicle may provide a radio signal from the base station to the baseband modem via a DU-CU interface through the RF device (S1803).

According to one embodiment, the autonomous vehicle may perform the tracking mode after performing the acquisition mode initiated in the present disclosure. In this regard, the autonomous vehicle may sequentially perform the acquisition mode and the tracking mode after the step S1703 and S1703a of transmitting an oscillator clock of the central unit CU to each distributed unit DU. To this end, the autonomous vehicle may perform the step S1707 and S1707a of synchronizing the oscillator clock of the DU by each distributed unit DU, based on a difference between the oscillator clock of the DU and the oscillator clock of the CU. The autonomous vehicle may perform the step of providing a synchronized oscillator clock as a reference clock to an RF device of the DU.

Also, the autonomous vehicle may perform the step S1801 of providing a radio signal from the base station to the baseband modem via a DU-CU interface through an RF device. In this regard, the autonomous vehicle may provide a radio signal from the base station for each RF path to the baseband modem through an RF device. Also, the autonomous vehicle may perform the step S1807 of controlling oscillator clocks of each distributed unit DU on the basis of frequency offsets for each RF path.

In relation to the tracking mode, the step S1807 of controlling oscillator clocks of each distributed unit DU on the basis of frequency offsets for each RF path may be performed.

In the step S1807 of controlling oscillator clocks of each distributed unit DU on the basis of frequency offsets for each RF path, oscillator clock errors of each distributed unit DU may be individually controlled to have different values. After the step S1807 of individually controlling an oscillator clock of each distributed unit DU, the step S1811 of providing an individually controlled oscillator clock as a reference clock to an RF device of the DU may be performed. Accordingly, the autonomous vehicle may control the VCXO of each DU so that frequency offsets for each RF path are corrected, by using the individually controlled oscillator clocks. Also, the step S1801 of providing a radio signal from the base station to the baseband modem via a DU-CU interface through an RF device may be performed.

According to another embodiment, the autonomous vehicle may perform the initiated acquisition mode, after performing the tracking mode initiated in the present disclosure. In this regard, in the step S1811 of controlling oscillator clocks of each distributed unit DU on the basis of frequency offsets for each RF path, oscillator clock errors of each distributed unit DU may be individually controlled to have different values.

After the step S1801 of controlling oscillator clocks of each distributed unit DU, a series of procedures associated with the tracking mode may be performed. The autonomous vehicle may perform the step S1801 of providing individually controlled oscillator clocks as reference blocks to RF devices of DUs. Also, the autonomous vehicle may perform the step S1803 of providing a radio signal from the base station to the baseband modem through a DU-CU interface through an RF device that has received a reference clock.

After performing the tracking mode, the autonomous vehicle may perform the acquisition mode. After the step S1803 of providing a radio signal from the base station to the baseband modem via a DU-CU interface through an RF device, the acquisition mode may be performed. The autonomous vehicle may perform the step S1703 of transmitting an oscillator clock of the central unit CU to each distributed unit DU. In this regard, the oscillator clock of the central unit CU may be a clock whose frequency error is corrected in consideration of the overall frequency offsets for each Rx path. For example, the oscillator clock of the central unit CU may be corrected by averaging the frequency offsets for each RX path.

The autonomous vehicle may perform the step S1705 and S1705a of synchronizing an oscillator clock of the DU by each distributed unit DU, based on a difference between the oscillator clock of DU and the oscillator clock of the CU. The autonomous vehicle may perform the step S1801 of providing a synchronized oscillator clock as a reference clock of an RF device of the DU. Also, the autonomous vehicle may perform the step S1803 of providing a radio signal from the base station to the baseband modem via a DU-CU interface through an RF device.

Figure 19A:
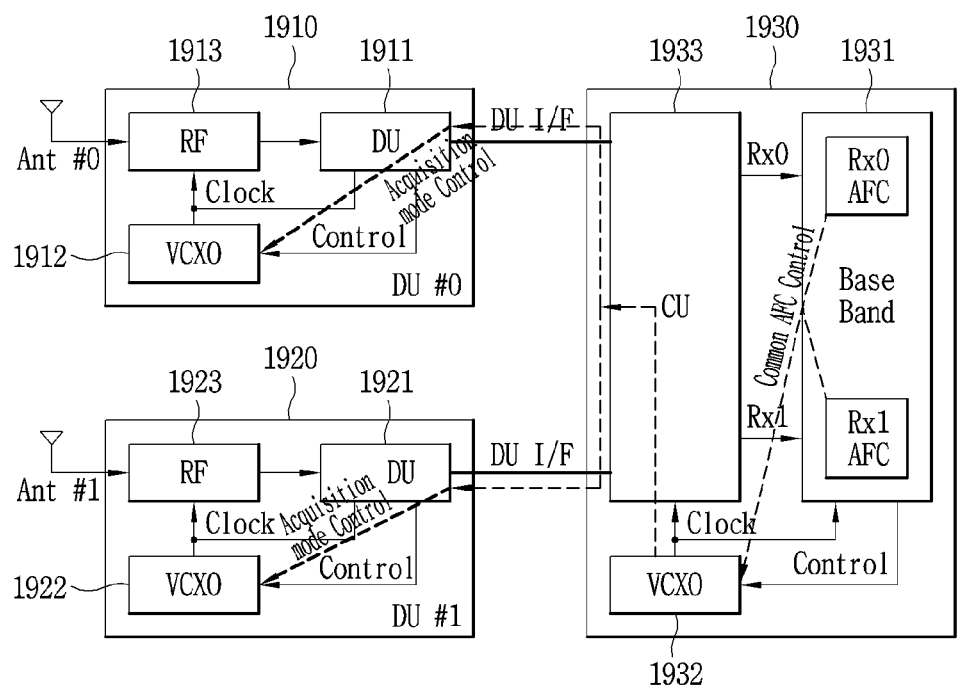
FIGS. 19A and 19B are block diagrams illustrating an example of distributed antenna systems that operate in different modes according to an embodiment of the present disclosure.
Figure 19B:
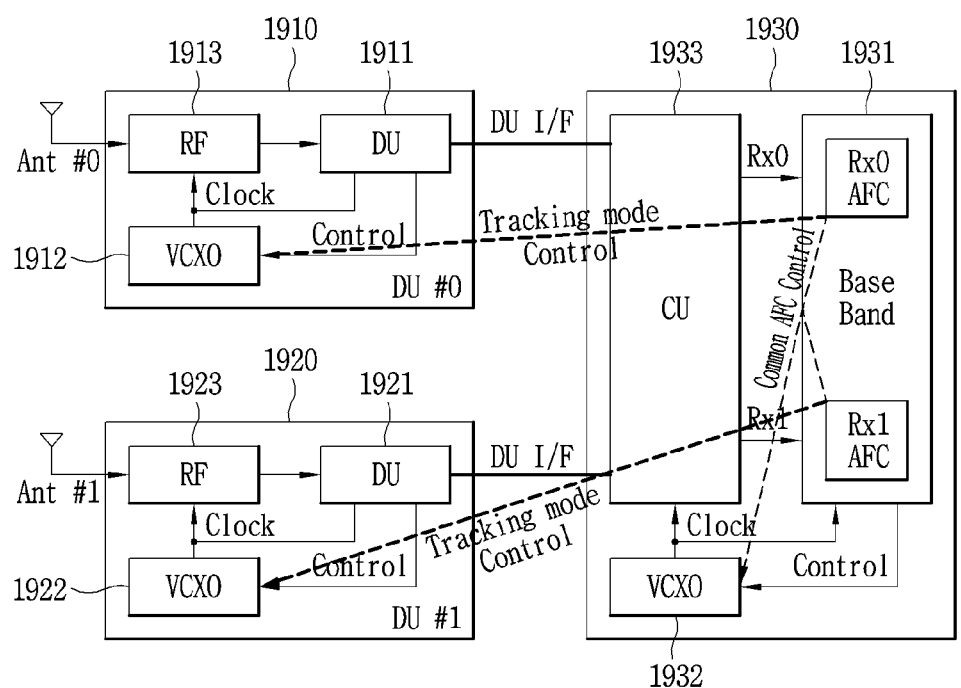

FIGS. 19A and 19B are block diagrams illustrating an example of distributed antenna systems that operate in different modes according to an embodiment of the present disclosure.

As illustrated in FIGS. 19A and 19B, a distributed antenna system (DAS) 1900 may include a central unit 1930, a first distributed unit (first DU) 1910, and a second distributed unit (second DU) 1920.

The first distributed unit (first DU) 1910 may include a DU I/F interface 1911, a VCXO (voltage-controlled crystal oscillator) 1912, and an RF unit 1913. The second distributed unit (second DU) 1920 may include a DU I/F interface 1921, a VCXO 1922, and an RF unit 1923.

The DU I/F interface 1911 and 1921 may operate as a DU controller, apart from its DU I/F interface functionality. Accordingly, the DU I/F interface 1911 and 1921 may be referred to as a DU controller or a DU processor. Referring to FIG. 14, the DU processor 1911 and 1921 may include a DU configuration corresponding to the rear of ADC (analog-digital converter). For another example, the DU processor 1911 and 1921 may include a DU configuration corresponding to the rear of VCXO. In this case, the DU processor 1911 and 1921 may include an ADC.

The RF unit 1913 and 1923 may be referred to as an RF front end or an RF transceiver circuit. Referring to FIG. 14, the RF unit 1913 and 1923 may include an RF transmitter and an RF receiver. The RF unit 1913 and 1923 may include an RF receiver including an RF switch/duplexer, a BPF (band pass filter), an LNA (low-noise amplifier), and a BPF. The RF unit 1913 and 1923 may include an RF receiver including an RF switch/duplexer, a BPF, a PA (power amplifier), and a BPF.

The central unit (CU) 1930 may include a baseband modem 1931, a VCXO 1932, and a CU I/F interface 1933.

The CU I/F interface 1933 of the central unit may operate as a CU processor, apart from its CU I/F interface functionality. Accordingly, the CU I/F interface 1933 may be referred to as a CU controller or a CU processor. Referring to FIGS. 13 and 14, the CU processor 1933 may include a multiplexer 1321 for multiplexing data received via a DU I.F interface for each DU path. The CU processor 1933 may further include a CU DeFramer 1322 and a CU data recovery block 1323. Through this, the baseband modem 1330, 1423, and 1931 may receive Rx data and information on a receiving status.

The CU I/F interface 1933 may transmit base station data transmitted from each distributed unit to the baseband modem 1931. The baseband modem 1931 may correspond to the baseband modem controller 1631 of FIG. 16. The CU processor 1933 may include a CU framer 1324 for receiving and framing transmission data and antenna control information. Transmission data and antenna control information transmitted for each CU framer in a plurality of CU processors may be transmitted to and multiplexed in the multiplexor 1313 in the DU I/F interface 1310. The DU processor 1911 and 1921 may send Tx data through a corresponding antenna through the multiplexed transmission data and antenna control information.

The distributed antenna system 1900 of FIGS. 19A and 19B may perform a clock synchronization method for an autonomous vehicle to be described with reference to FIGS. 17 and 18.

The baseband modem of the central unit may reset the VC-TXCO CU clock 1932. The baseband modem may synchronize the VC-TXCO CU clock with the clock of the base station by using base station data transmitted via a CU I/F interface from each distributed unit.

The baseband modem of the central unit may transmit information related to the clock of the base station to each distributed unit via a CU I/F interface.

The VC-TXCO CU clock 1932 of the central unit may provide an applied clock to the CU I/F interface.

The DU I/F interface 1911 and 1921 of each distributed unit may apply a transmitted clock value from the base station to the VC-TXCO DU clock 1912 and 1922.

The VC-TXCO DU clock of each distributed unit may provide an applied clock to the DU antenna 1913 and 1923 of each distributed unit.

A DU antenna of each distributed unit may receive base station data according to a clock synchronized with the base station. Here, the DU I/F interface and the CU I/F interface may be connected by a high speed serial interface. A detailed description of the DU/IF interface and the CU I/F interface will be placed with the description of FIG. 16D.

For example, the central unit may define a protocol for transmitting data and clock-related information together on a high speed serial interface, and transmit data and clock-related information to a plurality of distributed units based on the defined protocol. A detailed description of a procedure for the baseband modem to calculate a clock offset and adjusting a VC-TCXO CU clock will be replaced with the description of FIG. 16.

The distributed antenna system 1900 may be disposed in such a vehicle as an autonomous vehicle. Accordingly, the distributed antenna system 1900 may be disposed in a vehicle 10 of FIG. 2. The number of distributed units is not limited to what is exemplified in FIGS. 19A and 19B. Thus, the distributed antenna system 1900 may include a plurality of distributed units and a central unit. However, for convenience of explanation, the distributed antenna system 1900 will be described below as including a plurality of distributed units 1910 and 1920 and a central unit 1930.

The central unit (CU) 1930 may be configured to be operatively coupled to the plurality of distributed units 1910 and 1920 and to control the plurality of distributed units 1910 and 1920. The central unit 1930 may calculate frequency offsets for each RF path in the baseband modem, and control an oscillator clock of the central unit 1930 on the basis of an average of the frequency offsets. When an operation mode of the baseband modem is a tracking mode, the central unit 1930 may control oscillator clocks of each distributed unit DU on the basis of the frequency offsets for each RF path. When the operation mode of the baseband modem is an acquisition mode, the central unit 1930 may transmit the oscillator clock of the central unit 1930 to each distributed unit 1910 and 1920.

In the tracking mode, the central unit 1930 may individually control oscillator clock errors of each distributed unit 1910 and 1920 to have different values. To this end, clock errors may be individually controlled according to frequency offsets for each RF path. In the acquisition mode, the central unit 1930 may commonly control every distributed unit DU so that the oscillator clock error of each distributed unit DU has the same value. To this end, every distributed unit DU may be commonly controlled to have the same value on the basis of an average of the frequency offsets for each RF path.

Referring to FIG. 19A, the distributed antenna system 1900 may operate in the acquisition mode.

The central unit 1930 may transmit an oscillator clock of the central unit 1930 to each distributed unit 1910 and 1920. Each distributed unit 1910 and 1920 may synchronize an oscillator clock based on a difference between the oscillator clock of the DU and the oscillator clock of the CU. Also, each distributed unit 1910 and 1920 may provide a radio signal from the base station to the baseband modem 1931 via a DU-CU interface through an RF device. Accordingly, the baseband modem 1931 may determine whether to perform the acquisition mode or the tracking mode.

Referring to FIG. 19B, the distributed antenna system 1900 may operate in the tracking mode.

The central unit 1930 may individually control oscillator clock errors of each distributed unit 1910 and 1920 to have different values. Each distributed unit 1910 and 1920 may provide an individually controlled oscillator clock as a reference clock to an RF device of the DU. Also, each distributed unit 1910 and 1920 may provide a radio signal from the base station to the baseband modem 1631 via a DU-CU interface. Accordingly, the baseband modem 1931 may determine whether to perform the acquisition mode or the tracking mode.

Referring to FIGS. 17 to 19B, a method proposed in the present disclosure is to properly control VCXO of DU according to an operation mode (operation step) of the baseband modem. The operation mode of the baseband modem may be divided into an acquisition mode and a tracking mode in a process of connecting to the base station.

Meanwhile, in order for a post-LTE UE operating in a 4G and/or 5G communication system to communicate with the base station, a cell search process needs to be performed. In this regard, the UE is able to receive PSS and SSS and receive a PBCH signal. The UE may receive PDCCH and PDSCH by using information contained in the received PSS, SSS, and PBCH signal. In an implementation of the present disclosure, in the above-described operation of the baseband modem, the steps performed until the reception of PBCH may be identified as the acquisition mode. On the other hand, the steps performed after the reception of PBCH may be identified as the tracking mode.

Clock synchronization with the base station may be performed by an AFC (automatic frequency control) function. The baseband modem 1931 operates in such a way that the VCXO 1912, 1922, and 1932 is controlled by measuring the amount of phase change from I/Q data received from each Rx path and calculating a frequency offset with the base station.

When the baseband modem 1931 operates in the tracking mode, the baseband modem 1931 controls the VCXO clock 1632 of the CU by adding frequency errors calculated for each Rx data path. In this case, clock information may be transmitted through data transmitted from the CU 1930 to the DU 1910 and 1920. The DU 1910 and 1920 may recover its clock information by using the transmitted clock information, and controls the VCXO 1912 and 1922 so as to be synchronized with the VCXO clock of the CU 1930.

FIG. 19A shows a clock synchronization structure based on the acquisition mode of a distributed antenna. In the acquisition mode of FIG. 19A, each DU operates independently so as to be synchronized with the VCXO clock of the CU, and therefore an instantaneous clock offset may occur between the DUs.

If the baseband modem is operating in the tracking mode as a core operation of the present disclosure to solve this issue, the baseband modem 1931 may directly control the VCXO of each DU 1910 and 1920 by using frequency errors calculated for each Rx data path. Thus, the baseband modem 1931 may control the VCXO 1912 and 1922 so as to be synchronized with the clock of the base station. In this case, the VCXO 1932 of the CU 1930 may be controlled by adding frequency errors of each Rx path.

Referring to FIG. 19B, although the VCXO 1932 of the CU 1930 is commonly controlled, it is not controlled to be synchronized with the VCXO 1912 and 1922 of each DU 1910 and 1920. In this case, the baseband modem 1930 may directly control the VCXO 1912 and 1922 of each DU 1910 and 1920 via a control interface between CU and DU. By individually controlling the clock of an RF device in the tracking mode in accordance with a reception signal of each path, communication performance may be improved when signals are received at high data rates.

A system according to an implementation of the present disclosure is configured by connecting a CU and two DUs, but also may be configured by connecting two or more DUs.

Figure 20:
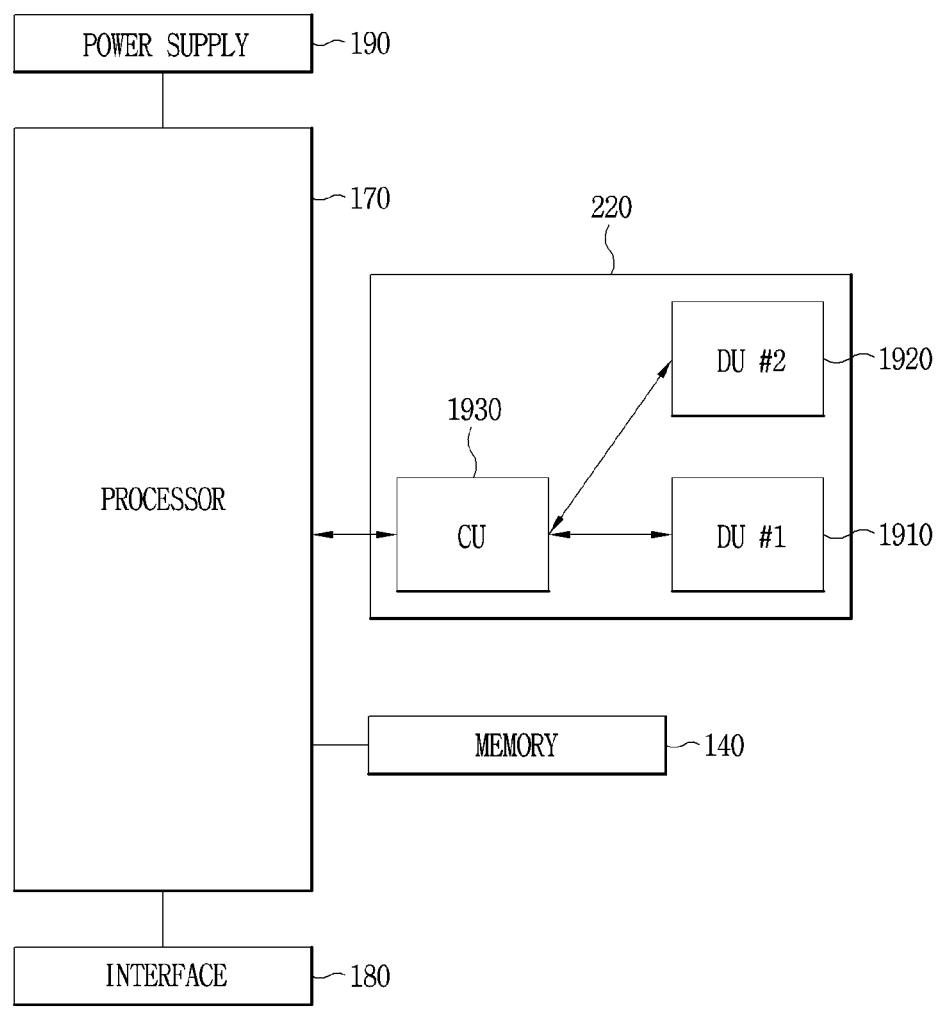
FIG. 20 is a block diagram of an autonomous vehicle according to an embodiment of the present disclosure.

FIG. 20 is a block diagram of an autonomous vehicle according to an embodiment of the present disclosure.

Referring to FIGS. 19A to 20, the autonomous vehicle may include a memory 140, a processor 170, and a communication device 220. The communication device 220 may include some components of the following: a central unit CU and 1930 and a plurality of distributed units DU. Although the plurality of distributed units DU may include, but not limited to, a first distributed unit DU1 AND 1910 and a second distributed unit DU2 and 1920, and may include a certain number of distributed units.

The processor 170 may be configured to control functions of the vehicle. The memory 140 may be coupled to the processor, and configured to store data for vehicle control. The communication device 220 may be coupled to the processor 170, and configured to send and receive data for vehicle control.

The processor 170 may be the baseband modem 1631 and 1931 of FIGS. 16, 19A, and 19B, but not limited thereto.

The processor 170 may calculate frequency offsets for each RF path of the communication device 220, and control an oscillator clock of the central unit 1930 on the basis of an average of the frequency offsets. When an operation mode of the baseband modem is the tracking mode, the processor 170 may control oscillator clocks of each distributed unit DU on the basis of the frequency offsets for each RF path. When the operation mode of the baseband modem is the acquisition mode, the processor 170 may transmit an oscillator clock of the central unit 1930 to each distributed unit 1910 and 1920.

The processor 170 may individually control oscillator clock errors of each distributed unit 1910 and 1920 to have different values. To this end, clock errors may be individually controlled according to frequency offsets for each RF path. In the acquisition mode, the processor 170 may commonly control every distributed unit DU so that the oscillator clock error of each distributed unit DU has the same value. To this end, every distributed unit DU may be commonly controlled to have the same value on the basis of an average of the frequency offsets for each RF path.

According to one embodiment, the autonomous vehicle may operate in the acquisition mode. The processor 170 may transmit an oscillator clock of the central unit 1930 to each distributed unit 1910 and 1920. Each distributed unit 1910 and 1920 may synchronize an oscillator clock based on a difference between the oscillator clock of the DU and the oscillator clock of the CU. Each distributed unit 1910 and 1920 may provide a synchronized oscillator clock as a reference clock to an RF device of the DU. Also, each distributed unit 1910 and 1920 may provide a radio signal from the base station to the processor 170 via a DU-CU interface through an RF device. Accordingly, the processor 170 may determine whether to perform the acquisition mode or the tracking mode.

According to another embodiment, the autonomous vehicle may operate in the tracking mode. The processor 170 may individually control oscillator clock errors of each distributed unit 1910 and 1920 to have different values. Each distributed unit 1910 and 1920 may provide an individually controlled oscillator clock as a reference clock to an RF device of the DU. Also, each distributed unit 1910 and 1920 may provide a radio signal from the base station to the processor 170 via a DU-CU interface. Accordingly, the processor 170 may determine whether to perform the acquisition mode or the tracking mode.

Referring to FIGS. 17 to 19B, a method proposed in the present disclosure is to properly control VCXO of DU according to an operation mode (operation step) of the baseband modem. The operation mode of the baseband modem may be divided into an acquisition mode and a tracking mode in a process of connecting to the base station.

A system according to an implementation of the present disclosure is configured by connecting a CU and two DUs, but also may be configured by connecting two or more DUs.

Meanwhile, communication performance (e.g., BER (bit error rate) or BLER (block error rate)) may be improved through a synchronization method for a distributed antenna system to be described in the present disclosure. In this regard, FIGS. 21A and 21B show a comparison of BLER vs. SNR (signal-noise ratio).

Figure 21A:
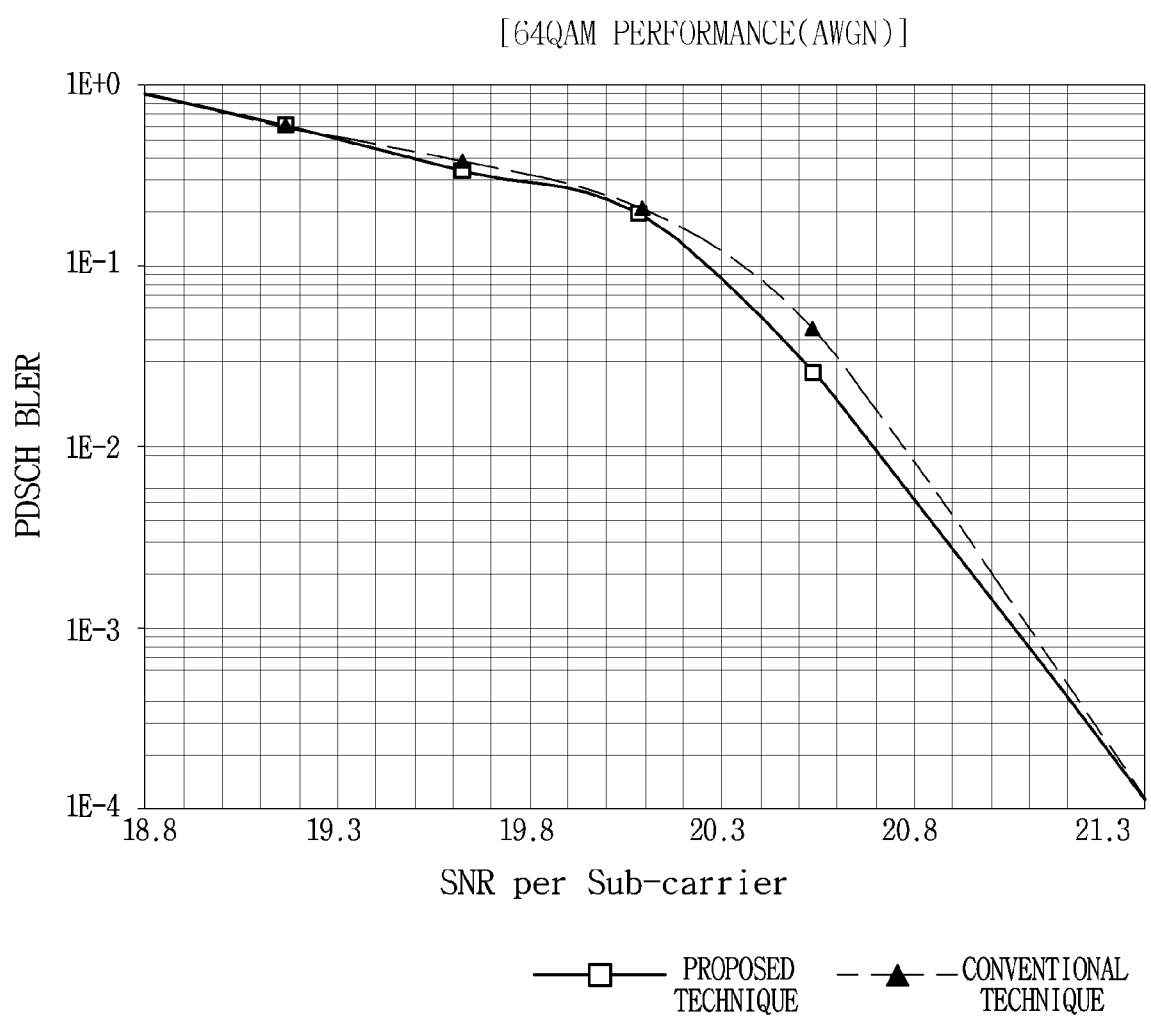
FIGS. 21A to 21B show a comparison of BLER versus SNR (signal-to-noise) according to different embodiments.
Figure 21B:
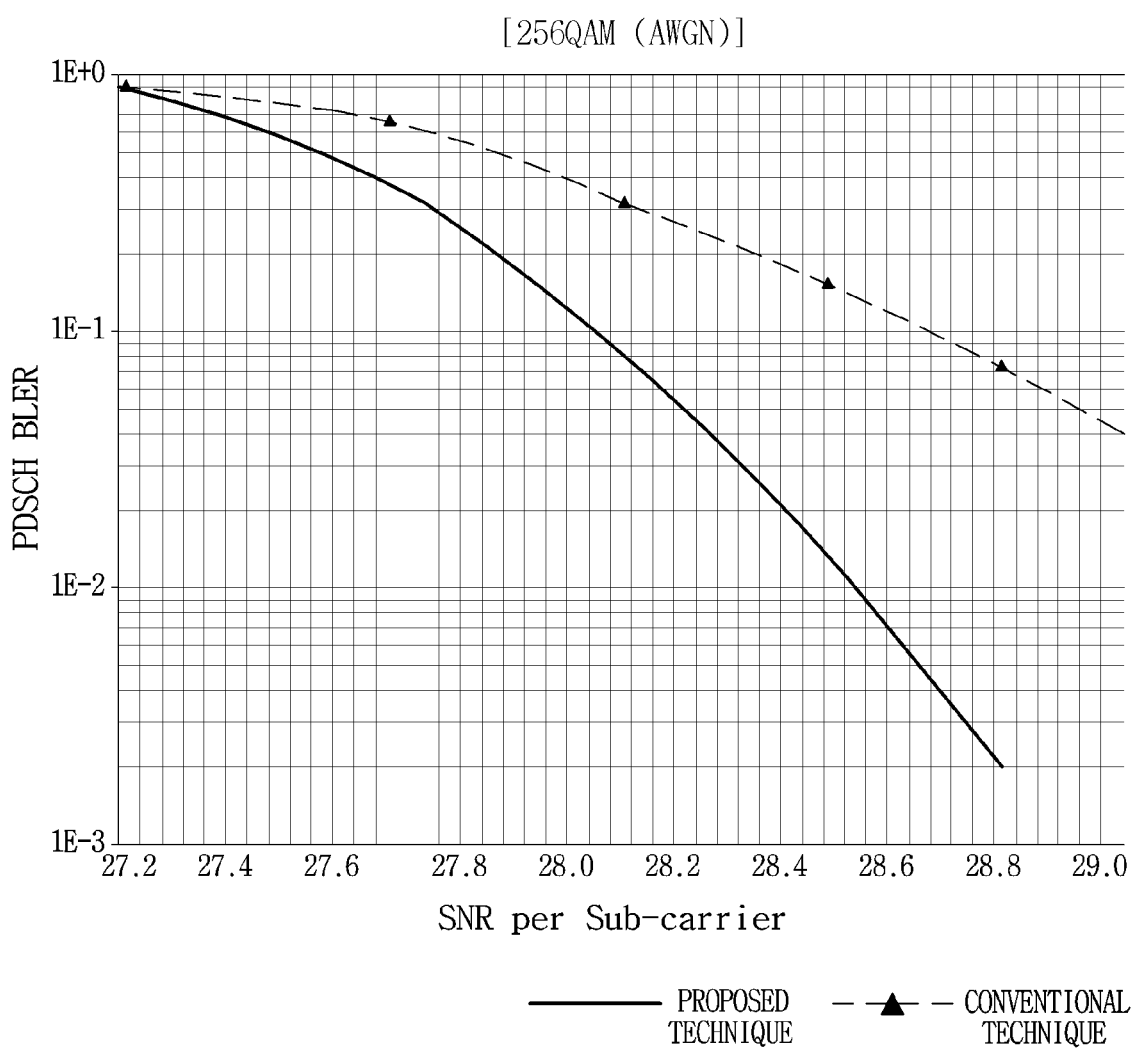

Referring to FIGS. 21A and 21B, system performance test results were improved by applying a clock synchronization structure for a distributed antenna system proposed in the present disclosure. FIG. 21A shows BLER vs. SNR when 640QAM (quadrature amplitude modulation) and OFDM are used. FIG. 21B shows BLER vs. SNR when 256-QAM and OFDM are used. For each of FIGS. 21A and 21B, a method of commonly controlling oscillator clocks of every DU and a method of individually controlling oscillator clocks of every DU were compared.

Referring to FIG. 21A, when 64QAM/OFDM was used, BLER performance was improved by about 0.1 dB @10%. Referring to FIG. 21B, when 256 QAM/OFDM was used, BLER performance was improved by about 0.65 dB @10%.

In relation to system performance, DU common control is smaller in performance degradation at low MCS, compared to DU individual control. Accordingly, DU individual control proposed in the present disclosure was measured to be improved in performance by about 0.1 dB compared to DU common control. On the other hand, DU common control has higher performance degradation than DU individual control, in a high MCS situation. Accordingly, DU individual control proposed in the present disclosure was measured to be improved in performance by about 0.65 dB compared to DU common control.

Such a performance comparison of SNR requirements is a result of comparison at a point in time when BLER is 10% upon receiving 5G NR signal in a channel environment with AWGN. Accordingly, the performance comparison of SNR requirements may change depending on the test environment.

Embodiment 1: A control method of a distributed antenna system (DAS) including a baseband modem includes the steps of: calculating frequency offsets for each RF path in the baseband modem; controlling an oscillator clock of a central unit (CU) on the basis of an average of the frequency offsets; determining an operation mode of the baseband modem; and controlling oscillator clocks of each distributed unit (DU) on the basis of the frequency offsets for each RF path when the operation mode of the baseband modem is a tracking mode Embodiment 2: In Embodiment 1, the control method may further include the step of transmitting the oscillator clock of the central unit (CU) to each distributed unit (DU) when the operation mode of the baseband modem is an acquisition mode.

Embodiment 3: In Embodiment 1, in the tracking mode, oscillator clock errors of each distributed unit (DU) are individually controlled to have different values, and in the acquisition mode, the oscillator clock errors of each distributed unit (DU) are commonly controlled to have the same value.

Embodiment 4: In Embodiment 2, the control method may further include, after the step of transmitting the oscillator clock of the central unit (CU) to each distributed unit (DU), the steps of: synchronizing an oscillator clock of the DU by each distributed unit (DU), based on a difference between the oscillator clock of the DU and the oscillator clock of the CU; providing a synchronized oscillator clock as a reference clock to an RF device of the DU; and providing a radio signal from the base station to the baseband modem via a DU-CU interface through the RF device.

Embodiment 5: In Embodiment 1, in the step of controlling an oscillator clock of each distributed unit (DU) on the basis of the frequency offsets for each RF path, oscillator clock errors of each distributed unit (DU) are individually controlled to have different values. The control method may further include, after the step of individually controlling an oscillator clock of each distributed unit (DU), the steps of: providing an individually controlled oscillator clock as a reference clock to an RF device of the DU; and providing a radio signal from the base station to the baseband modem via a DU-CU interface through the RF device.

Embodiment 6: In Embodiment 4 or Embodiment 5, the control method may further include the step of calculating frequency offsets for each RF path in the baseband modem with respect to the radio signal from the base station, after the step of providing a radio signal from the base station to the baseband modem.

Embodiment 7, In Embodiment 6, the step of calculating frequency offsets may include calculating frequency offsets with the clock of the base station based on the in-phase component and quadrature phase component of a signal received for each RF path.

Embodiment 8: In Embodiment 1, in the step of determining an operation mode of the baseband modem, upon determining that the baseband modem has performed cell search, it is determined that the operation mode of the baseband modem is the tracking mode, and upon determining that the operation mode of the baseband modem is performed before the cell search, it is determined that the operation mode of the baseband modem is the acquisition mode.

Embodiment 9: Embodiment 1, in the step of determining an operation mode of the baseband modem, it is determined whether PBCH (physical broadcasting channel) has been successfully received, and, if the PBCH has been successfully received, it is determined that the operation mode of the baseband modem is the tracking mode, and if the PBCH has not been successfully received, it is determined that the operation mode of the baseband modem is the acquisition mode.

Embodiment 10: In Embodiment 1, the control method may further include, after the step of transmitting the oscillator clock of the central unit (CU) to each distributed unit (DU), the steps of: synchronizing an oscillator clock of the DU by each distributed unit (DU), based on a difference between the oscillator clock of the DU and the oscillator clock of the CU; providing a synchronized oscillator clock as a reference clock to an RF device of the DU; providing a radio signal from the base station to the baseband modem via a DU-CU interface through the RF device; and controlling an oscillator clock of each distributed unit (DU) on the basis of the frequency offsets for each RF path.

Embodiment 11: In Embodiment 10, in the step of controlling an oscillator clock of each distributed unit (DU) on the basis of the frequency offsets for each RF path, oscillator clock errors of each distributed unit (DU) are individually controlled to have different values. The control method may further include, after the step of individually controlling an oscillator clock of each distributed unit (DU), the steps of: providing the individually controlled oscillator clock as a reference clock to the RF device of the DU; and providing a radio signal from the base station to the baseband modem via a DU-CU interface through the RF device.

Embodiment 12: In Embodiment 1, in the step of controlling an oscillator clock of each distributed unit (DU) on the basis of the frequency offsets for each RF path, oscillator clock errors of each distributed unit (DU) are individually controlled to have different values. The control method may further include, after the step of individually controlling an oscillator clock of each distributed unit (DU), the steps of: providing the individually controlled oscillator clock as a reference clock to the RF device of the DU; and providing a radio signal from the base station to the baseband modem via a DU-CU interface through the RF device.

Embodiment 13: In Embodiment 12, the control method may further include, after the step of providing a radio signal from the base station to the baseband modem via a DU-CU interface through the RF device, the steps of: transmitting the oscillator clock of the central unit (CU) to each distributed unit (DU); synchronizing an oscillator clock of the DU by each distributed unit (DU), based on a difference between the oscillator clock of the DU and the oscillator clock of the CU; providing a synchronized oscillator clock as a reference clock to an RF device of the DU; and providing a radio signal from the base station to the baseband modem via a DU-CU interface through the RF device.

Embodiment 14: A distributed antenna system including a baseband modem and a plurality of distributed antennas includes: a plurality of distributed units DU; and a central unit (CU) operatively coupled to the plurality of distributed units and to control the plurality of distributed units, wherein the central unit calculates frequency offsets for each RF path in the baseband modem, controls an oscillator clock of the central unit (CU) on the basis of an average of the frequency offsets, controls oscillator clocks of each distributed unit (DU) on the basis of the frequency offsets for each RF path when the operation mode of the baseband modem is a tracking mode, and transmits the oscillator clock of the central unit (CU) to each distributed unit (DU) when the operation mode of the baseband modem is an acquisition mode.

Embodiment 15: In Embodiment 14, in the tracking mode, the central unit (CU) individually controls oscillator clock errors of each distributed unit (DU) to have different values. In the acquisition mode, the central unit (CU) commonly controls the oscillator clock errors of each distributed unit (DU) to have the same value.

Embodiment 16: In Embodiment 14, the central unit (CU) transmits the oscillator clock of the central unit (CU) to each distributed unit (DU), and each distributed unit (DU) synchronizes an oscillator clock based on a difference between the oscillator clock of the DU and the oscillator clock of the CU, provides a synchronized oscillator clock as a reference clock to an RF device of the DU, and provides a radio signal from the base station to the baseband modem via a DU-CU interface through the RF device.

Embodiment 17: In Embodiment 14, the central unit (CU) individually controls oscillator clock errors of each distributed unit (DU) to have different values, and each distributed unit (DU) provides an individually controlled oscillator clock as a reference clock to the RF device of the DU, and provides a radio signal from the base station to the baseband modem via a DU-CU interface through the RF device.

Embodiment 18: An autonomous vehicle includes: a processor for controlling functions of the vehicle; a memory coupled to the processor, for storing data for control of the vehicle; and a communication device coupled to the processor, for sending and receiving data for control of the vehicle, the communication device including a central unit (CU) and a plurality of distributed units operatively coupled to the central unit (CU). The processor calculates frequency offsets for each RF path in the communication device, controls an oscillator clock of the central unit (CU) on the basis of an average of the frequency offsets, controls oscillator clocks of each distributed unit (DU) on the basis of the frequency offsets for each RF path when the operation mode of the baseband modem is a tracking mode, and transmits the oscillator clock of the central unit (CU) to each distributed unit (DU) when the operation mode of the baseband modem is an acquisition mode.

Embodiment 19: In Embodiment 18, the processor transmits the oscillator clock of the central unit (CU) to each distributed unit (DU), and each distributed unit (DU) synchronizes an oscillator clock based on a difference between the oscillator clock of the DU and the oscillator clock of the CU, provides a synchronized oscillator clock as a reference clock to an RF device of the DU, and provides a radio signal from the base station to the processor via a DU-CU interface through the RF device.

Embodiment 20: In Embodiment 18, the processor individually controls oscillator clock errors of each distributed unit (DU) to have different values, and each distributed unit (DU) provides an individually controlled oscillator clock as a reference clock to the RF device of the DU, and provides a radio signal from the base station to the processor via a DU-CU interface through the RF device.

An autonomous vehicle and a control method of the autonomous vehicle according to an embodiment of the present disclosure has the following advantageous effects.

The present disclosure allows for low-cost design using data clock recovery by suggesting a method of synchronizing clocks between a central unit (controller) and a distributed unit (antenna) in an autonomous vehicle including a distributed antenna structure.

Furthermore, the present disclosure may provide higher speed data transmission/reception performance compared to an existing analog interface, via a HSSI (high speed serial interface) between a central unit and a distributed unit.

Furthermore, the present disclosure may enhance the wireless communication performance of an autonomous driving system by improving the expandability of a distributed antenna structure.

Furthermore, the present disclosure may improve the reception performance of a modem by minimizing clock offsets for each RF path and time tracking error in a distributed antenna system.

Furthermore, the present disclosure may improve performance degradation that occurs in a high MCS situation by minimizing clock offsets for each RF path and time tracking error in a distributed antenna system.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A control method of a distributed antenna system (DAS) including a baseband modem comprises the steps of:
calculating frequency offsets for each RF path in the baseband modem; controlling an oscillator clock of a central unit (CU) on the basis of an average of the frequency offsets;
determining an operation mode of the baseband modem;
controlling oscillator clocks of each distributed unit (DU) on the basis of the frequency offsets for each RF path when the operation mode of the baseband modem is a tracking mode; and
transmitting the oscillator clock of the central unit (CU) to each distributed unit (DU) when the operation mode of the baseband modem is an acquisition mode,
wherein in the tracking mode, oscillator clock errors of each distributed unit (DU) are individually controlled to have different values, and in the acquisition mode, the oscillator clock errors of each distributed unit (DU) are commonly controlled to have the same value.

2. The control method of claim 1, further comprising, after the step of transmitting the oscillator clock of the central unit (CU) to each distributed unit (DU), the steps of:
synchronizing an oscillator clock of the DU by each distributed unit (DU), based on a difference between the oscillator clock of the DU and the oscillator clock of the CU;
providing a synchronized oscillator clock as a reference clock to an RF device of the DU; and
providing a radio signal from the base station to the baseband modem via a DU-CU interface through the RF device.

3. The control method of claim 1, wherein, in the step of controlling an oscillator clock of each distributed unit (DU) on the basis of the frequency offsets for each RF path, oscillator clock errors of each distributed unit (DU) are individually controlled to have different values,
wherein the control method further comprises, after the step of individually controlling an oscillator clock of each distributed unit (DU), the steps of:
providing an individually controlled oscillator clock as a reference clock to an RF device of the DU; and
providing a radio signal from the base station to the baseband modem via a DU-CU interface through the RF device.

4. The control method of claim 3, further comprising the step of calculating frequency offsets for each RF path in the baseband modem with respect to the radio signal from the base station, after the step of providing a radio signal from the base station to the baseband modem.

5. The control method of claim 4, wherein the step of calculating frequency offsets comprises calculating frequency offsets with the clock of the base station based on the in-phase component and quadrature phase component of a signal received for each RF path.

6. The control method of claim 1, wherein, in the step of determining an operation mode of the baseband modem, it is determined whether PBCH (physical broadcasting channel) has been successfully received, and, if the PBCH has been successfully received, it is determined that the operation mode of the baseband modem is the tracking mode, and if the PBCH has not been successfully received, it is determined that the operation mode of the baseband modem is the acquisition mode.

7. The control method of claim 1, further comprising, after the step of transmitting the oscillator clock of the central unit (CU) to each distributed unit (DU), the steps of:
synchronizing an oscillator clock of the DU by each distributed unit (DU), based on a difference between the oscillator clock of the DU and the oscillator clock of the CU;
providing a synchronized oscillator clock as a reference clock to an RF device of the DU;
providing a radio signal from the base station to the baseband modem via a DU-CU interface through the RF device; and
controlling an oscillator clock of each distributed unit (DU) on the basis of the frequency offsets for each RF path.

8. The control method of claim 7, wherein, in the step of controlling an oscillator clock of each distributed unit (DU) on the basis of the frequency offsets for each RF path, oscillator clock errors of each distributed unit (DU) are individually controlled to have different values,
wherein the control method further comprises, after the step of individually controlling an oscillator clock of each distributed unit (DU), the steps of:

providing the individually controlled oscillator clock as a reference clock to the RF device of the DU; and
providing a radio signal from the base station to the baseband modem via a DU-CU interface through the RF device.

9. A control method of a distributed antenna system (DAS) including a baseband modem comprises the steps of:
calculating frequency offsets for each RF path in the baseband modem;
controlling an oscillator clock of a central unit (CU) on the basis of an average of the frequency offsets;
determining an operation mode of the baseband modem;
controlling oscillator clocks of each distributed unit (DU) on the basis of the frequency offsets for each RF path when the operation mode of the baseband modem is a tracking mode; and
transmitting the oscillator clock of the central unit (CU) to each distributed unit (DU) when the operation mode of the baseband modem is an acquisition mode,
wherein, in the step of determining an operation mode of the baseband modem, upon determining that the baseband modem has performed cell search, it is determined that the operation mode of the baseband modem is the tracking mode, and upon determining that the operation mode of the baseband modem is performed before the cell search, it is determined that the operation mode of the baseband modem is the acquisition mode.

10. The control method of claim 9, wherein, in the step of controlling an oscillator clock of each distributed unit (DU) on the basis of the frequency offsets for each RF path, oscillator clock errors of each distributed unit (DU) are individually controlled to have different values,
wherein the control method further comprises, after the step of individually controlling an oscillator clock of each distributed unit (DU), the steps of:
providing the individually controlled oscillator clock as a reference clock to the RF device of the DU; and
providing a radio signal from the base station to the baseband modem via a DU-CU interface through the RF device.

11. The control method of claim 10, further comprising, after the step of providing a radio signal from the base station to the baseband modem via a DU-CU interface through the RF device, the steps of:
transmitting the oscillator clock of the central unit (CU) to each distributed unit (DU);
synchronizing an oscillator clock of the DU by each distributed unit (DU), based on a difference between the oscillator clock of the DU and the oscillator clock of the CU;
providing a synchronized oscillator clock as a reference clock to an RF device of the DU; and
providing a radio signal from the base station to the baseband modem via a DU-CU interface through the RF device.

12. A distributed antenna system including a baseband modem and a plurality of distributed antennas comprises:
a plurality of distributed units DU; and
a central unit (CU) operatively coupled to the plurality of distributed units and to control the plurality of distributed units,
wherein the central unit calculates frequency offsets for each RF path in the baseband modem, controls an oscillator clock of the central unit (CU) on the basis of an average of the frequency offsets, controls oscillator clocks of each distributed unit (DU) on the basis of the frequency offsets for each RF path when the operation mode of the baseband modem is a tracking mode, and transmits the oscillator clock of the central unit (CU) to each distributed unit (DU) when the operation mode of the baseband modem is an acquisition mode,
wherein, in the tracking mode, the central unit (CU) individually controls oscillator clock errors of each distributed unit (DU) to have different values, and in the acquisition mode, the central unit (CU) commonly controls the oscillator clock errors of each distributed unit (DU) to have the same value.

13. The distributed antenna system of claim 12, wherein the central unit (CU) transmits the oscillator clock of the central unit (CU) to each distributed unit (DU), and each distributed unit (DU) synchronizes an oscillator clock based on a difference between the oscillator clock of the DU and the oscillator clock of the CU, provides a synchronized oscillator clock as a reference clock to an RF device of the DU, and provides a radio signal from the base station to the baseband modem via a DU-CU interface through the RF device.

14. The distributed antenna system of claim 12, wherein the central unit (CU) individually controls oscillator clock errors of each distributed unit (DU) to have different values, and each distributed unit (DU) provides an individually controlled oscillator clock as a reference clock to the RF device of the DU, and provides a radio signal from the base station to the baseband modem via a DU-CU interface through the RF device.

15. An autonomous vehicle comprises:
a processor for controlling functions of the vehicle;
a memory coupled to the processor, for storing data for control of the vehicle; and
a communication device coupled to the processor, for sending and receiving data for control of the vehicle,
the communication device including a central unit (CU) and a plurality of distributed units operatively coupled to the central unit (CU),
wherein the processor calculates frequency offsets for each RF path in the communication device, controls an oscillator clock of the central unit (CU) on the basis of an average of the frequency offsets, controls oscillator clocks of each distributed unit (DU) on the basis of the frequency offsets for each RF path when the operation mode of the baseband modem is a tracking mode, and transmits the oscillator clock of the central unit (CU) to each distributed unit (DU) when the operation mode of the baseband modem is an acquisition mode,
wherein the processor individually controls oscillator clock errors of each distributed unit (DU) to have different values, and each distributed unit (DU) provides an individually controlled oscillator clock as a reference clock to the RF device of the DU, and provides a radio signal from the base station to the processor via a DU-CU interface through the RF device.

16. The autonomous vehicle of claim 15, wherein the processor transmits the oscillator clock of the central unit (CU) to each distributed unit (DU), and each distributed unit (DU) synchronizes an oscillator clock based on a difference between the oscillator clock of the DU and the oscillator clock of the CU, provides a synchronized oscillator clock as a reference clock to an RF device of the DU, and provides a radio signal from the base station to the processor via a DU-CU interface through the RF device.

17. The autonomous vehicle of claim 15, wherein the processor determines that the operation mode of the baseband modem is the tracking mode, upon determining that the baseband modem has performed cell search, determines that the operation mode of the baseband modem is the acquisition mode, upon determining that the operation mode of the baseband modem is performed before the cell search.

* * * * *